(12) United States Patent
Choi et al.

(10) Patent No.: US 10,600,220 B2
(45) Date of Patent: Mar. 24, 2020

(54) SYSTEMS AND METHODS FOR CONTENT INTERACTION

(71) Applicant: Facebook, Inc., Menlo Park, CA (US)

(72) Inventors: Christine Choi, San Francisco, CA (US); Nathan Andrew Sharp, San Francisco, CA (US); William Samuel Bailey, San Francisco, CA (US); Ashoke K. Chakrabarti, Oakland, CA (US); Joshua Barton Dickens, Oakland, CA (US); Joy-Vincent Niemantsverdriet, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/396,438

(22) Filed: Dec. 31, 2016

(65) Prior Publication Data

US 2018/0033173 A1 Feb. 1, 2018

Related U.S. Application Data

(60) Provisional application No. 62/369,682, filed on Aug. 1, 2016.

(51) Int. Cl.
| | |
|---|---|
| *G06T 11/60* | (2006.01) |
| *G06F 3/0488* | (2013.01) |
| *G06F 3/0482* | (2013.01) |
| *G06F 3/0484* | (2013.01) |
| *G06Q 50/00* | (2012.01) |
| *H04L 29/06* | (2006.01) |
| *G06T 13/80* | (2011.01) |
| *H04L 29/08* | (2006.01) |

(52) U.S. Cl.
CPC ............ *G06T 11/60* (2013.01); *G06F 3/0482* (2013.01); *G06F 3/04845* (2013.01); *G06F 3/04883* (2013.01); *G06T 13/80* (2013.01); *H04L 67/10* (2013.01); *H04L 67/306* (2013.01); *H04L 67/38* (2013.01); *G06Q 50/01* (2013.01)

(58) Field of Classification Search
CPC .... G06T 11/60; G06F 3/0482; G06F 3/04883; G06F 17/24; G06F 3/0484; G06F 3/04842; G06Q 50/01
USPC .................................................. 345/629
See application file for complete search history.

(56) References Cited

U.S. PATENT DOCUMENTS

| | | | | |
|---|---|---|---|---|
| 9,338,242 | B1* | 5/2016 | Suchland | H04L 67/22 |
| 9,600,803 | B2* | 3/2017 | Greenberg | G06F 17/2247 |
| 9,813,642 | B1* | 11/2017 | Chen | H04N 1/00244 |
| 9,841,879 | B1* | 12/2017 | Gray | G06F 3/0484 |
| 9,980,100 | B1 | 5/2018 | Charlton | |
| 10,109,092 | B1* | 10/2018 | Hitchings, Jr. | G06T 11/60 |

(Continued)

*Primary Examiner* — Chante E Harrison
(74) *Attorney, Agent, or Firm* — Sheppard Mullin Richter & Hampton LLP

(57) ABSTRACT

Systems, methods, and non-transitory computer-readable media can provide a creative tools interface that includes one or more options for visually modifying at least one media content item to be posted through a social networking system. At least one visual modification is applied to the media content item in response to a user selection of one or more of the options. The visually modified media content item is posted through the social networking system, wherein the user designates whether the visually modified media content item is posted as an ephemeral media content item or as a non-ephemeral media content item.

20 Claims, 22 Drawing Sheets

(56) References Cited

U.S. PATENT DOCUMENTS

| | | | |
|---|---|---|---|
| 10,366,090 B2* | 7/2019 | Shorman | G06N 5/022 |
| 2011/0022589 A1 | 1/2011 | Bauer | |
| 2011/0249024 A1* | 10/2011 | Arrasvuori | G06F 3/017 |
| | | | 345/629 |
| 2012/0069028 A1 | 3/2012 | Bouguerra | |
| 2012/0249575 A1 | 10/2012 | Krolczyk | |
| 2013/0083215 A1 | 4/2013 | Wisniewski | |
| 2013/0222367 A1* | 8/2013 | Mariappan | G06T 19/006 |
| | | | 345/419 |
| 2013/0235045 A1 | 9/2013 | Corazza | |
| 2014/0195921 A1 | 7/2014 | Grosz | |
| 2014/0256389 A1 | 9/2014 | Wentling | |
| 2015/0022549 A1 | 1/2015 | Khosravy | |
| 2015/0063785 A1 | 3/2015 | Lee et al. | |
| 2015/0206349 A1* | 7/2015 | Rosenthal | H04N 21/41407 |
| | | | 345/633 |
| 2016/0041957 A1* | 2/2016 | Finsterwald | G06F 3/0484 |
| | | | 715/202 |
| 2016/0092428 A1* | 3/2016 | Ilic | G06F 3/04847 |
| | | | 715/765 |
| 2016/0103820 A1* | 4/2016 | Greenberg | G06F 17/212 |
| | | | 705/26.81 |
| 2016/0124934 A1* | 5/2016 | Greenberg | G06F 3/0483 |
| | | | 715/202 |
| 2016/0196584 A1* | 7/2016 | Franklin | G06Q 30/0267 |
| | | | 705/14.64 |
| 2016/0259464 A1* | 9/2016 | Chan | G06F 1/163 |
| 2016/0283088 A1* | 9/2016 | Greenberg | G06F 17/2247 |
| 2016/0284112 A1* | 9/2016 | Greenberg | G06F 17/3089 |
| 2016/0350953 A1* | 12/2016 | Mittelstaedt | G06T 11/60 |
| 2016/0357407 A1 | 12/2016 | Rogoway | |
| 2016/0360382 A1* | 12/2016 | Gross | G06F 3/0488 |
| 2017/0023554 A1* | 1/2017 | Whitten | C08G 61/02 |
| 2017/0060485 A1* | 3/2017 | Krilivsky | G06Q 30/0621 |
| 2017/0131779 A1 | 5/2017 | Walkin | |
| 2017/0132490 A1* | 5/2017 | Koch | G06K 9/6201 |
| 2017/0132600 A1* | 5/2017 | Egan | G06Q 20/327 |
| 2017/0185254 A1 | 6/2017 | Zeng | |
| 2017/0185268 A1 | 6/2017 | Zeng | |
| 2017/0185600 A1* | 6/2017 | Elliott | G06F 16/24578 |
| 2017/0199631 A1* | 7/2017 | Coffman | H04L 12/1827 |
| 2017/0236329 A1 | 8/2017 | Harvey | |
| 2017/0243403 A1 | 8/2017 | Daniels | |
| 2017/0336958 A1* | 11/2017 | Chaudhri | G06F 3/04883 |
| 2017/0336959 A1* | 11/2017 | Chaudhri | G06F 3/04883 |
| 2017/0336960 A1* | 11/2017 | Chaudhri | G06F 3/04883 |
| 2018/0005420 A1 | 1/2018 | Bondich | |
| 2018/0060416 A1* | 3/2018 | Bastide | G06F 16/9535 |
| 2018/0114364 A1 | 4/2018 | McPhee | |
| 2018/0146223 A1* | 5/2018 | Kedenburg, III | |
| | | | H04N 21/23418 |
| 2018/0167427 A1* | 6/2018 | Kedenburg, III | H04L 65/602 |
| 2018/0182141 A1* | 6/2018 | Caballero | G06T 11/00 |
| 2018/0183844 A1* | 6/2018 | Danker | H04L 65/4076 |
| 2018/0293771 A1 | 10/2018 | Piemonte | |
| 2019/0205015 A1* | 7/2019 | Smith | G06Q 50/01 |
| 2019/0206102 A1* | 7/2019 | Dalonzo | G06T 11/60 |

* cited by examiner

SYSTEMS AND METHODS FOR CONTENT INTERACTION

CROSS-REFERENCE TO RELATED APPLICATIONS

This application claims priority to U.S. Provisional Patent Application No. 62/369,682, filed on Aug. 1, 2016 and entitled "SYSTEMS AND METHODS FOR CONTENT INTERACTION", which is incorporated in its entirety herein by reference.

FIELD OF THE INVENTION

The present technology relates to the field of content interaction. More particularly, the present technology relates to techniques for providing users with the ability to interact with content.

BACKGROUND

Today, people often utilize computing devices (or systems) for a wide variety of purposes. Users can use their computing devices to, for example, interact with one another, access content, share content, and create content. In some cases, media content items can include postings from members of a social network. The postings may include text and media content items, such as images, videos, and audio. The postings may be published to the social network for consumption by others.

Under conventional approaches, users may post various media content items to a social networking system. In general, media content items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to provide a creative tools interface that includes one or more options for visually modifying at least one media content item to be posted through a social networking system. At least one visual modification is applied to the media content item in response to a user selection of one or more of the options. The visually modified media content item is posted through the social networking system, wherein the user designates whether the visually modified media content item is posted as an ephemeral media content item or as a non-ephemeral media content item.

In some embodiments, the systems, methods, and non-transitory computer readable media are configured to determine that the user has selected an option to insert a text overlay in the media content item, determine a string of text specified by the user through a virtual keyboard presented on a touch screen display of the computing device, and cause a text overlay corresponding to the string of text to be inserted in the media content item.

In some embodiments, the systems, methods, and non-transitory computer readable media are configured to determine one or more objects in the subject matter captured in the media content item based at least in part on a trained content classifier and provide one or more suggested text overlays based at least in part on the objects.

In some embodiments, the systems, methods, and non-transitory computer readable media are configured to determine that the user has selected an option to insert a graphical overlay in the media content item, determine at least one graphical overlay that was selected by the user, and cause the selected graphical overlay to be inserted in the media content item.

In some embodiments, the systems, methods, and non-transitory computer readable media are configured to determine one or more objects in the subject matter captured in the media content item based at least in part on a trained content classifier and provide one or more suggested graphical overlays based at least in part on the objects.

In some embodiments, the systems, methods, and non-transitory computer readable media are configured to determine that the user has selected an option to draw content in the media content item, determine content drawn by the user through a touch screen display of the computing device, and cause the drawn content to be inserted in the media content item.

In some embodiments, the systems, methods, and non-transitory computer readable media are configured to provide a content feed interface in which the posted media content item is included, determine that the user has performed one or more navigation gestures while navigating the content feed interface, and cause the content feed interface to be modified in response to the navigation gestures performed.

Various embodiments of the present disclosure can include systems, methods, and non-transitory computer readable media configured to provide a creative tools interface that includes one or more options for visually animating at least one portion of a media content item to be posted through a social networking system, at least one visual animation is applied to the media content item in response to a user selection of one or more of the options, the visually animated media content item is posted through the social networking system, wherein the user designates whether the visually animated media content item is posted as an ephemeral media content item or as a non-ephemeral media content item.

In some embodiments, the systems, methods, and non-transitory computer readable media are configured to determine that the user has selected an option to animate a text overlay in the media content item and cause the text overlay to animate when the media content item is viewed based at least in part on the user selection.

In some embodiments, the text is animated to simulate a shading effect.

In some embodiments, the shading of the text changes in response to one or more device gestures performed using the computing device.

In some embodiments, the systems, methods, and non-transitory computer readable media are configured to determine that the user has selected an option to insert an animated graphical overlay in the media content item and cause the graphical overlay to animate when the media content item is viewed based at least in part on the user selection.

In some embodiments, the graphical overlay is animated along at least one boundary of at least one object included in the subject matter captured in the media content item.

In some embodiments, the systems, methods, and non-transitory computer readable media are configured to determine at least one object included in the subject matter captured in the media content item based at least in part on a trained content classifier, determine that the user has selected an option to animate the object in the media content item, and cause at least one graphical overlay to animate at least one portion of the object when the media content item is viewed.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
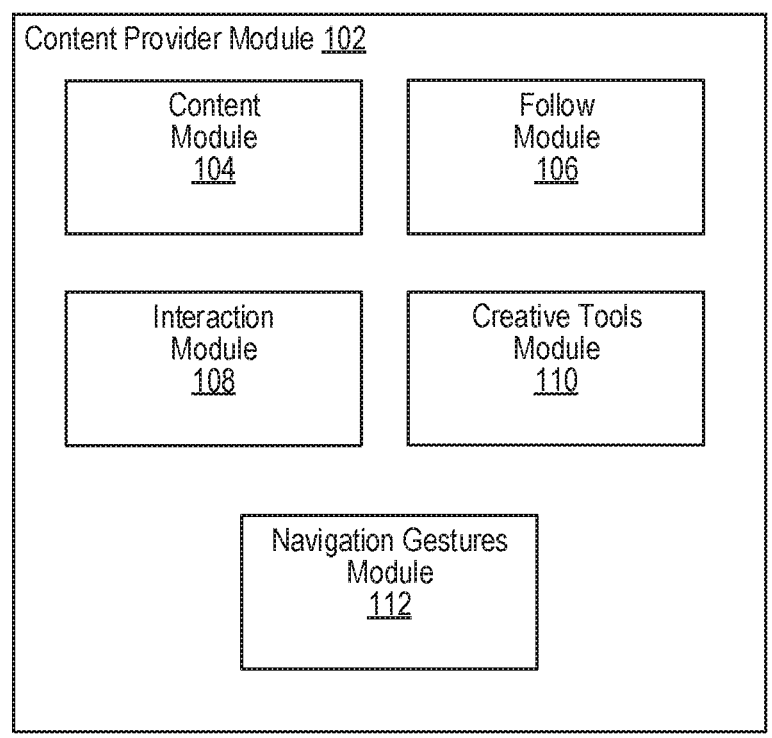
FIG. 1 illustrates an example system including an example content provider module, according to an embodiment of the present disclosure.
Figure 1:
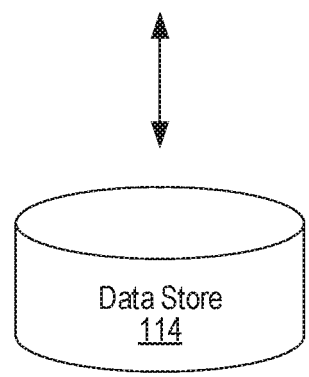

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Content Interaction

People often utilize computing devices (or systems) for a wide variety of purposes. Users can use their computing devices to, for example, interact with one another, access content, share content, and create content. In some cases, media content items can include postings from members of a social network. The postings may include text and media content items, such as images, videos, and audio. The postings may be published to the social network for consumption by others.

Under conventional approaches, users may post various media content items to the social networking system. In general, media content items posted by a first user can be included in the respective content feeds of other users of the social networking system that have "followed" the first user. By following (or subscribing to) the first user, some or all content that is produced, or posted, by the first user may be included in the respective content feeds of the users following the first user. A user following the first user can prevent new content from the first user from being included in the user's content feed by simply "unfollowing" the first user. Under conventional approaches, users can interact with media content items by liking a media content item or posting a comment in response to a media content item. Such approaches, however, typically do not permit users to visually modify existing media content items. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, users can visually interact with media content items using a creative tools interface that provides various editing capabilities. In one example, when posting a media content item to a social networking system, a user can make visual modifications to the media content item using the creative tools interface. Some examples of visual modifications include adding text overlays or drawings (e.g., scribbling, doodling, etc.) using virtual writing instruments (e.g., brushes, markers, etc.). The visual modifications can also involve adding graphical overlays (e.g., icons, stickers, filters, etc.) to media content items. Moreover, in some embodiments, the visual modifications can involve adding animations to media content items. Once the visual modifications are applied, the user has the option to share the media content item with other users of the social networking system either through an ephemeral content feed in which the media content item (i.e., ephemeral media content item) is temporarily available or through a non-ephemeral content feed in which the media content item (i.e., non-ephemeral media content item) persists for some extended period of time. The creative tools interface, therefore, allows users to visually enhance the media content items they share with other users of the social networking system. Such visual enhancements can help facilitate interaction among the users and can also drive user engagement with the social networking system.

FIG. 1 illustrates an example system 100 including an example content provider module 102, according to an embodiment of the present disclosure. As shown in the example of FIG. 1, the content provider module 102 can include a content module 104, a follow module 106, an interaction module 108, a creative tools module 110, and a navigation gestures module 112. In some instances, the example system 100 can include at least one data store 114. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 710 of FIG. 7. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 730 of FIG. 7.

The content provider module 102 can be configured to communicate and/or operate with the at least one data store 114, as shown in the example system 100. The at least one data store 114 can be configured to store and maintain various types of data. For example, the data store 114 can store information describing various content that has been posted by users of a social networking system. In some implementations, the at least one data store 114 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 114 can store information associated with users, such as user identifiers, user information, profile information, user specified settings, content produced or posted by users, and various other types of user data.

The content provider module 102 can be configured to provide users with access to content that is posted through a social networking system. For example, the content module 104 can provide a first user with access to media content items through an interface that is provided by a software application (e.g., a social networking application, browser, etc.) running on a computing device of the first user. The first user can also use the interface to post media content items to the social networking system. Such media content items may include text, images, audio, and videos, for example. In some embodiments, the software application is configured to send information describing user actions to the social networking system. Such information can include, for example, which media content items the first user has viewed, a respective view duration for each media content item, and other actions (e.g., like, comment, share, etc.) performed by the user with respect to a given media content item, to name some examples.

In various embodiments, other users of the social networking system can access media content items posted by the first user. In one example, the other users can access the media content items by searching for the first user, for example, by user name through an interface provided by a software application (e.g., a social networking application, browser, etc.) running on their respective computing devices. In some instances, some users may want to see media content items posted by the first user in their respective content feed. To cause media content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all media content items that are posted by the first user can automatically be included in the respective content feed of the user. If the user decides that they no longer want to see content from the first user in their respective content feed, the user can select an option through the interface to "unfollow" the first user. As a result, the follow module 106 can remove the association between the user and the first user so that media content items posted by the first user are no longer included in the content feed of the user. In some instances, the user may want to endorse, or "like", a media content item. In such instances, the user can select an option provided in the interface to like the desired media content item. The interaction module 108 can determine when a user likes a given media content item and can store information describing this relationship. In some instances, the user may want to post a comment in response to a media content item. In such instances, the user can select an option provided in the interface to enter and post the comment for the desired media content item. The interaction module 108 can determine when a user posts a comment in response to a given media content item and can store information describing this relationship. In some embodiments, such information can be stored in a social graph as described in reference to FIG. 7.

In various embodiments, the creative tools module 110 is configured to provide users with an interface for visually modifying media content items that are published through the social networking system. More details regarding the creative tools module 110 will be provided below with reference to FIG. 2. In some embodiments, the navigation gestures module 112 is configured to perform various operations in response to touch screen gestures that are performed by users. More details regarding the navigation gestures module 112 will be provided below with reference to FIG. 3.

Figure 2:
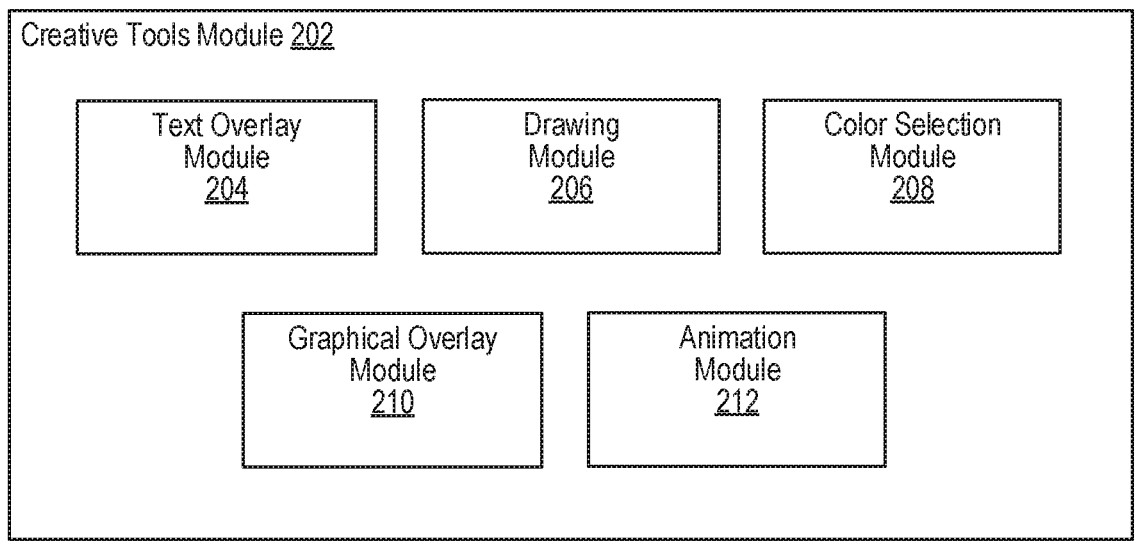
FIG. 2 illustrates an example creative tools module, according to an embodiment of the present disclosure.

FIG. 2 illustrates a creative tools module 202, according to an embodiment of the present disclosure. In some embodiments, the creative tools module 110 of FIG. 1 can be implemented with the creative tools module 202. As shown in the example of FIG. 2, the creative tools module 202 can include a text overlay module 204, a drawing module 206, a color selection module 208, a graphical overlay module 210, and an animation module 212.

In various embodiments, the creative tools module 202 can provide an editing interface that allows users to visually modify their media content items. For example, a user operating a computing device can access the editing interface through a software application (e.g., a social networking application) running on the computing device. In one example, the editing interface may be accessed when the user is sharing a media content item through the social networking system. The editing interface can provide the user with various options for visually modifying the media content item. Once the visual modifications have been made, the media content item can be shared through the social networking system. In some embodiments, the user has an option to share the modified media content item either through an ephemeral content feed or a non-ephemeral content feed. When included in the ephemeral content feed, the media content item can be available to other users (e.g., followers of the user) for a shortened period of time, i.e., the media content item is temporarily available. When included in the non-ephemeral content feed, the media content item can be available to the other users for some longer period of time. These periods of time can be pre-defined by the social networking system or, in some embodiments, by the user posting the media content item. In some embodiments, a media content item in the non-ephemeral content feed can be available through the social networking system until deleted by the user.

In some embodiments, the editing interface can provide an option for adding one or more text overlays to the media content item. When this option is selected, the text overlay module 204 can allow the user to input text through the computing device to be incorporated into the media content item. In some embodiments, a virtual keyboard is presented in the editing interface to allow the user to input text. The use can modify the font, or style, used for the text overlays. The user can also modify the color(s) used for the text overlays through the color selection module 204, as described below. In various embodiments, the user can drag and position the text overlays in the media content item as desired. In some embodiments, a text overlay can be wrapped, for example, around shapes (e.g., circle, square, etc.) to create curve-shaped or bent text.

Figure 4A:
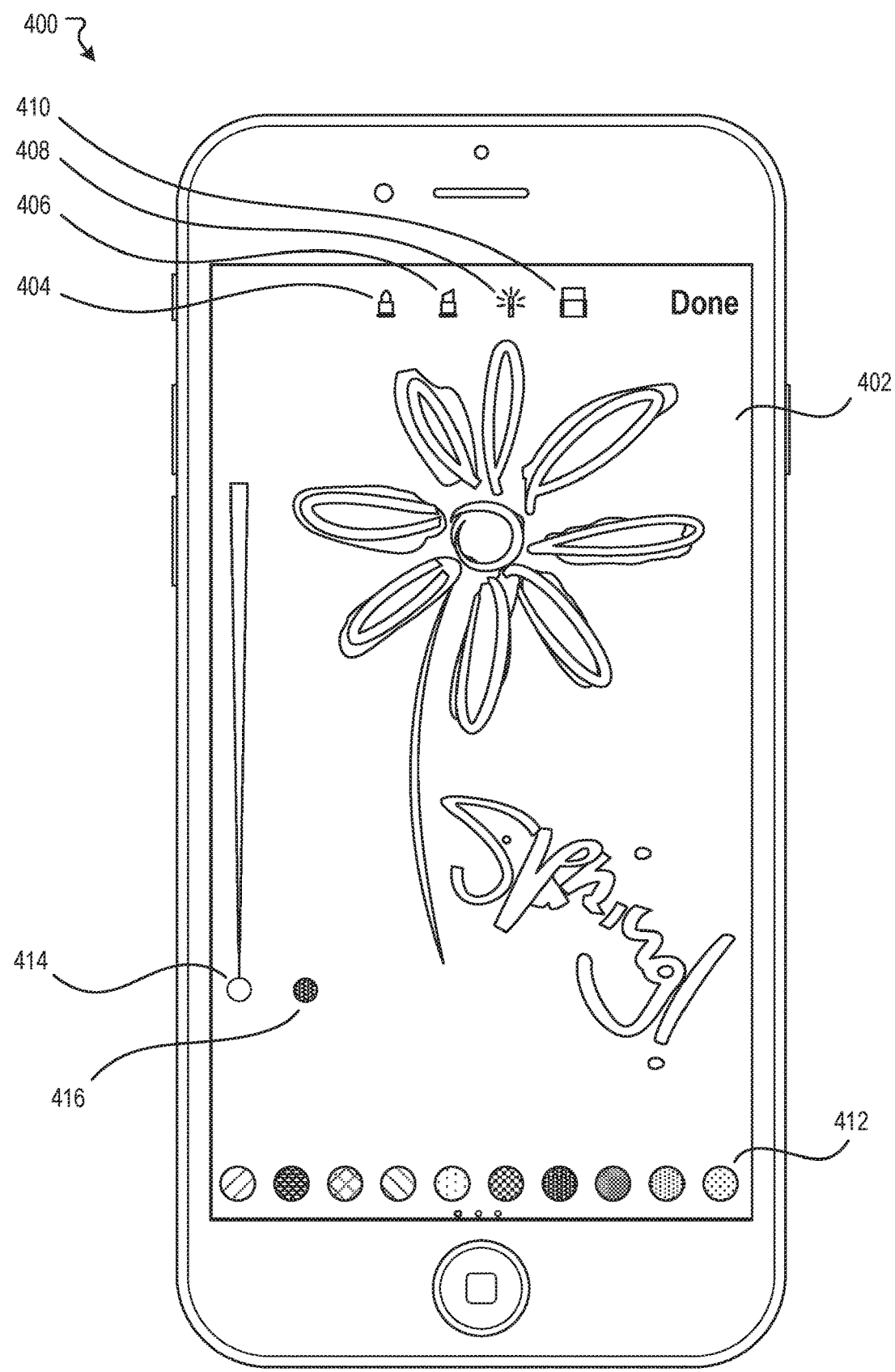
FIGS. 4A-O illustrate example interfaces, according to an embodiment of the present disclosure.
Figure 4B:
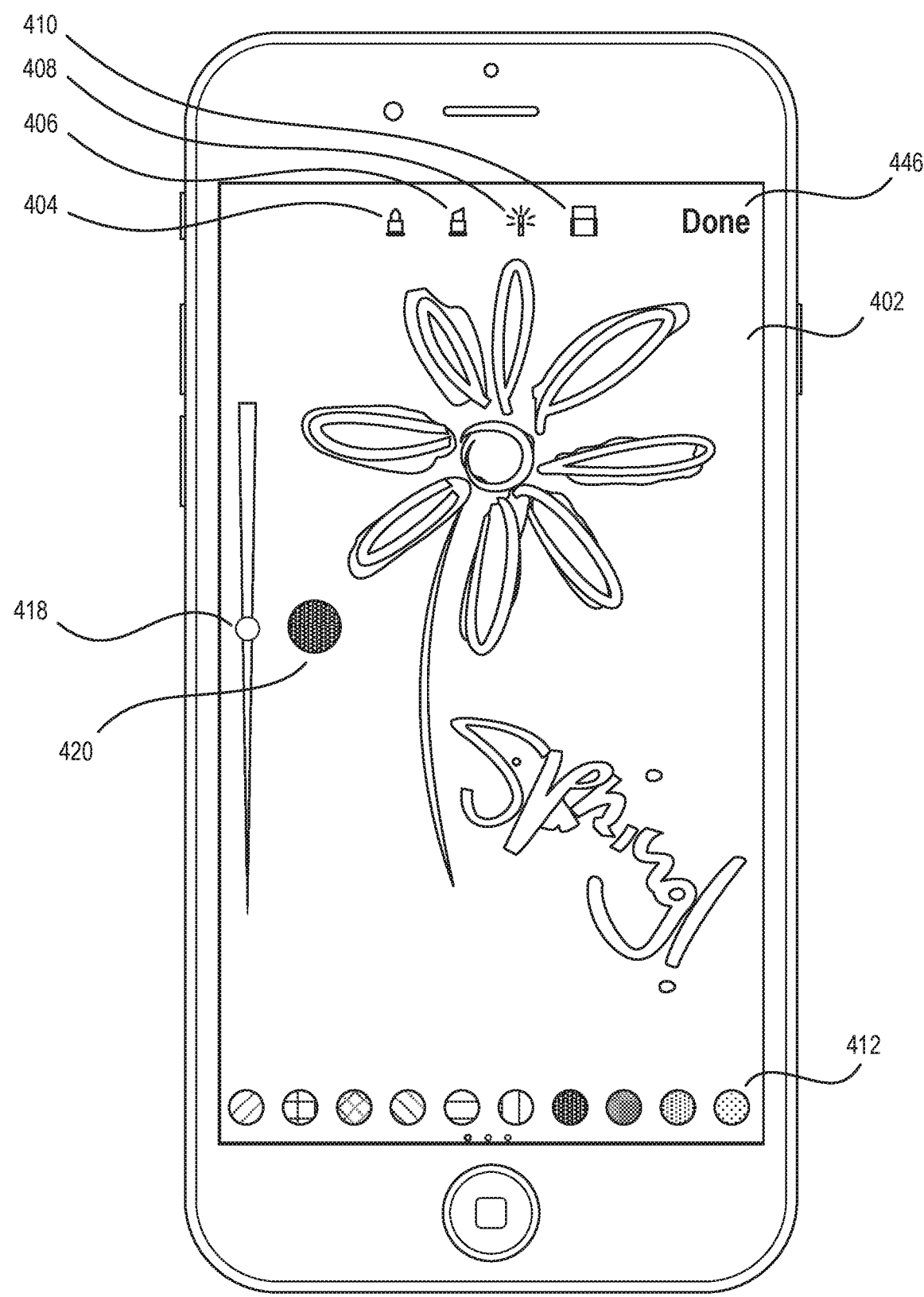
Figure 4C:
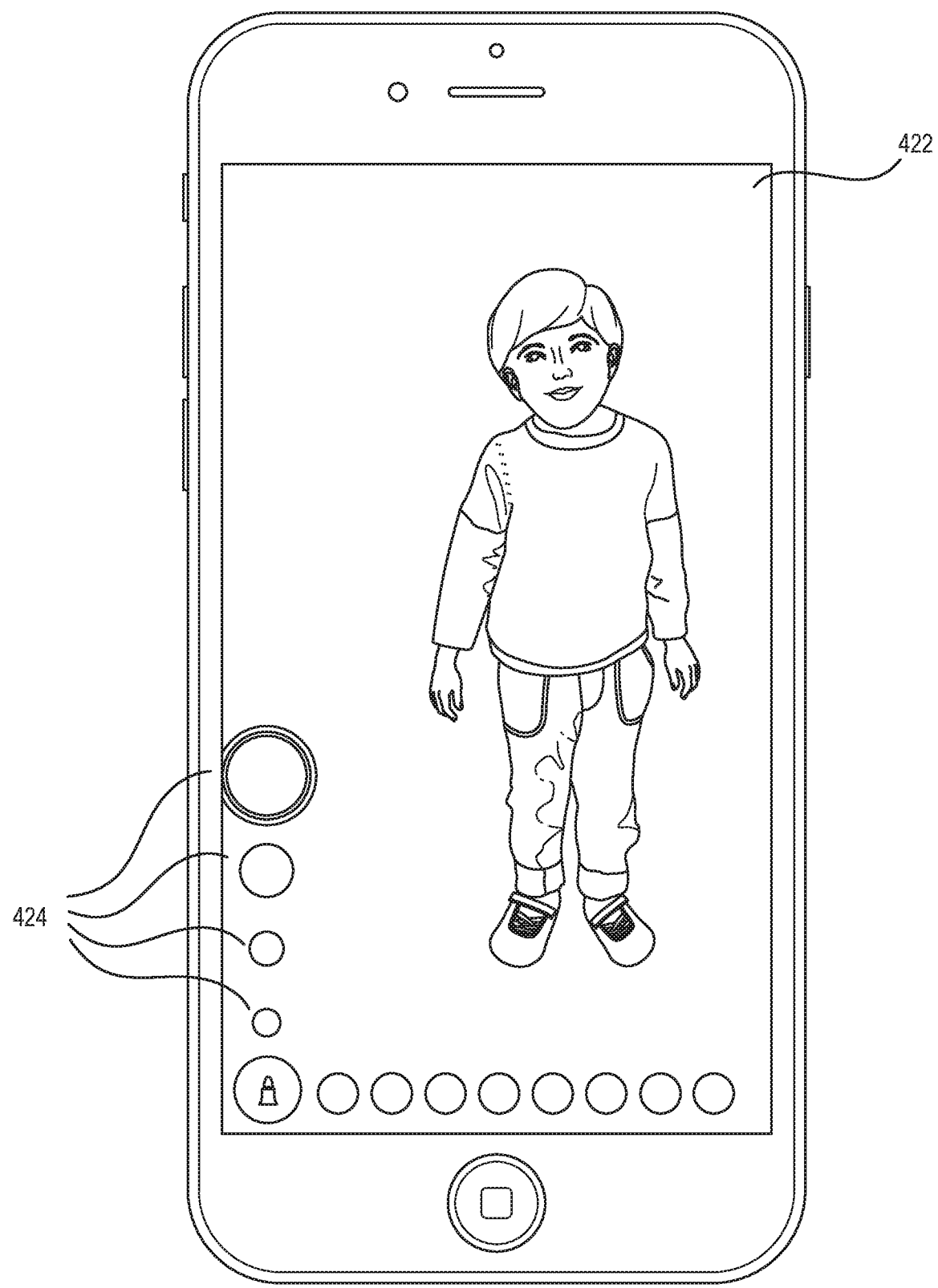

In some embodiments, the editing interface can provide an option for drawing content in the media content item. When this option is selected, the drawing module 206 can allow the user to select a virtual writing instrument with which the user can use to virtually draw in the media content item. In some embodiments, the virtual writing instruments that are available for selection include a marker, a brush, a magic marker, and eraser. FIG. 4A illustrates an example 400 of an interface 402 accessible through a computing device. The example interface 402 includes options for selecting virtual writing instruments including a virtual marker 404, a virtual brush 406, a virtual magic marker 408, and a virtual eraser 410. The example interface 402 also includes a color palette 412 from which the user can select colors to be used when drawing with the selected writing instrument. In some embodiments, the user can adjust the tip size 416 of a selected writing instrument, for example, by increasing or decreasing a tip size selector 414. The example of FIG. 4B illustrates the tip size 420 of the writing instrument increasing as the tip size selector 418 is increased. FIG. 4C illustrates another example approach for adjusting the tip size of the selected writing instrument. For example, in FIG. 4C, the user can select one of the pre-defined tip sizes 424 to select the tip size. Once a virtual writing instrument is selected, the user can draw using the virtual writing instrument directly through a touch screen display 422 of the computing device, for example, using the user's finger as the drawing instrument. In some embodiments, the creative tools module 202 can allow the user to perform multiple selections using touch screen gestures. In one example, the user can select a color from a color palette, for example, using a tap gesture. Next, while the user's finger remains touching the display screen, the user can move the finger horizontally to the left or right to adjust the tip size of the selected writing instrument. For example, the tip size can increase as the user's finger slides to the right. Similarly, the tip size can decrease as the user's finger slides to the left. In some embodiments, the user can select an option to obtain, or download, different sets of virtual writing instruments (e.g., brushes styled after popular artists, etc.) that are available through the social networking system. In some embodiments, the user can select an option to purchase different sets of virtual writing instruments that are available through the social networking system.

Figure 4D:
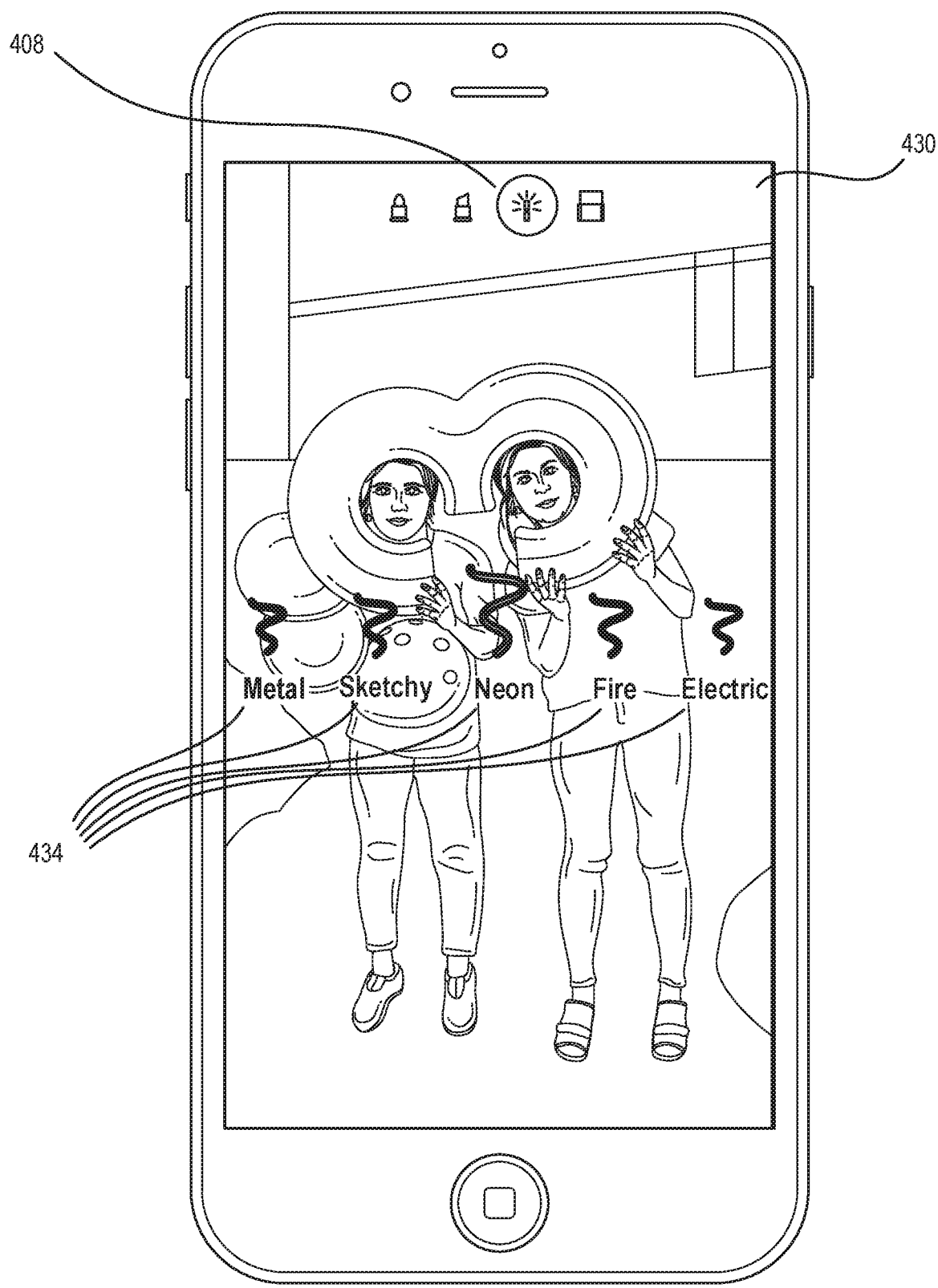
Figure 4E:
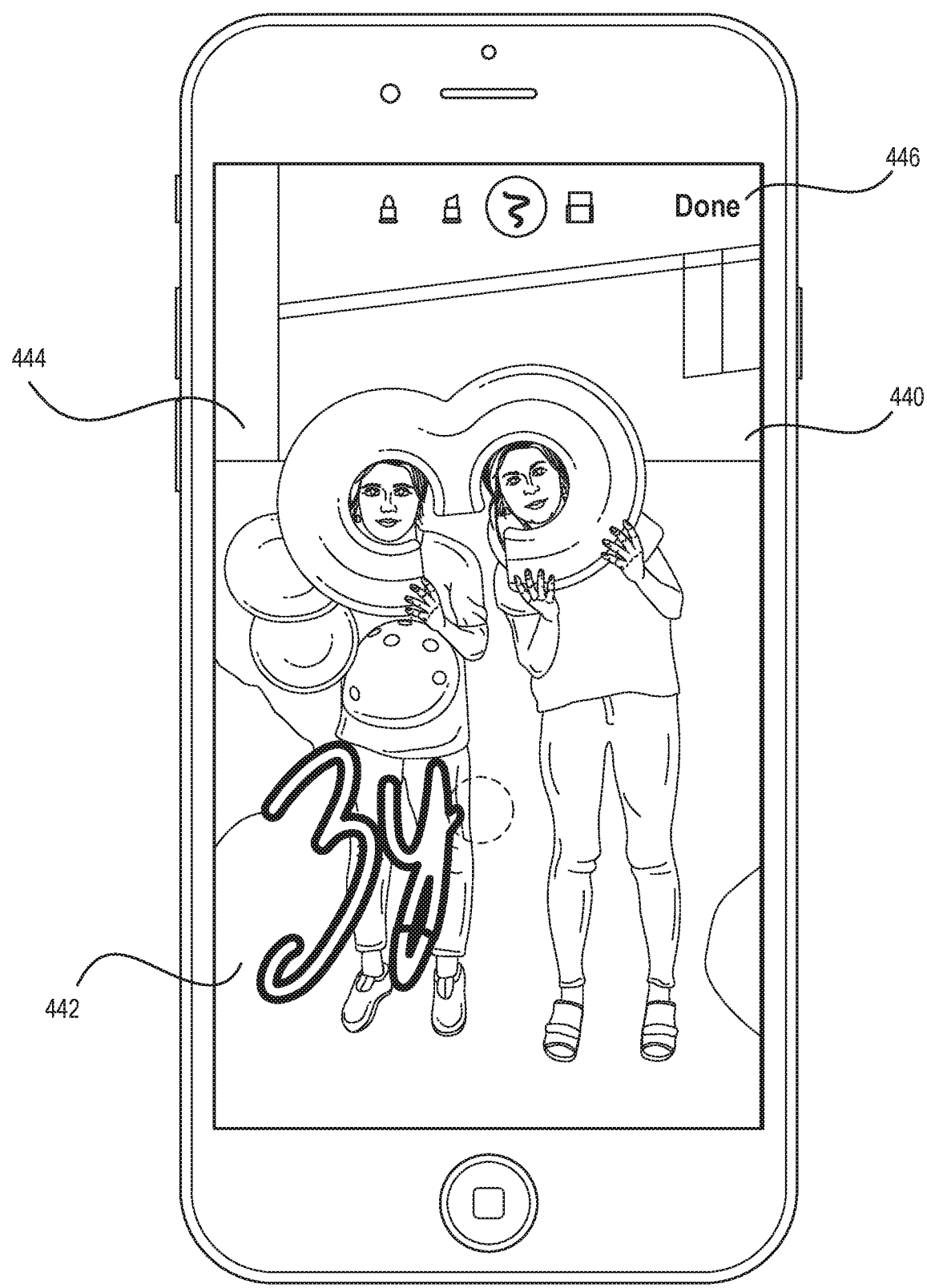
Figure 4F:
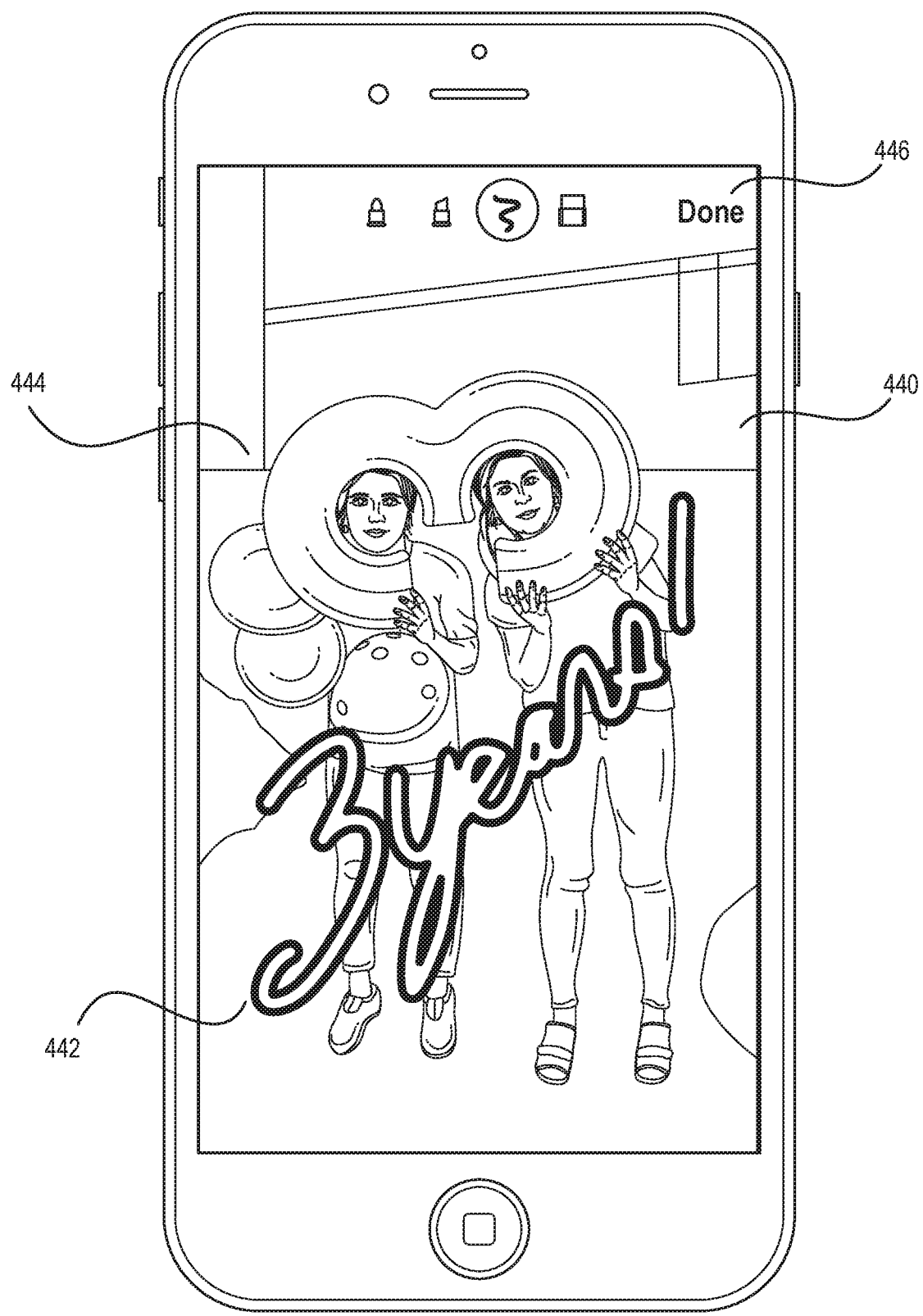
Figure 4G:
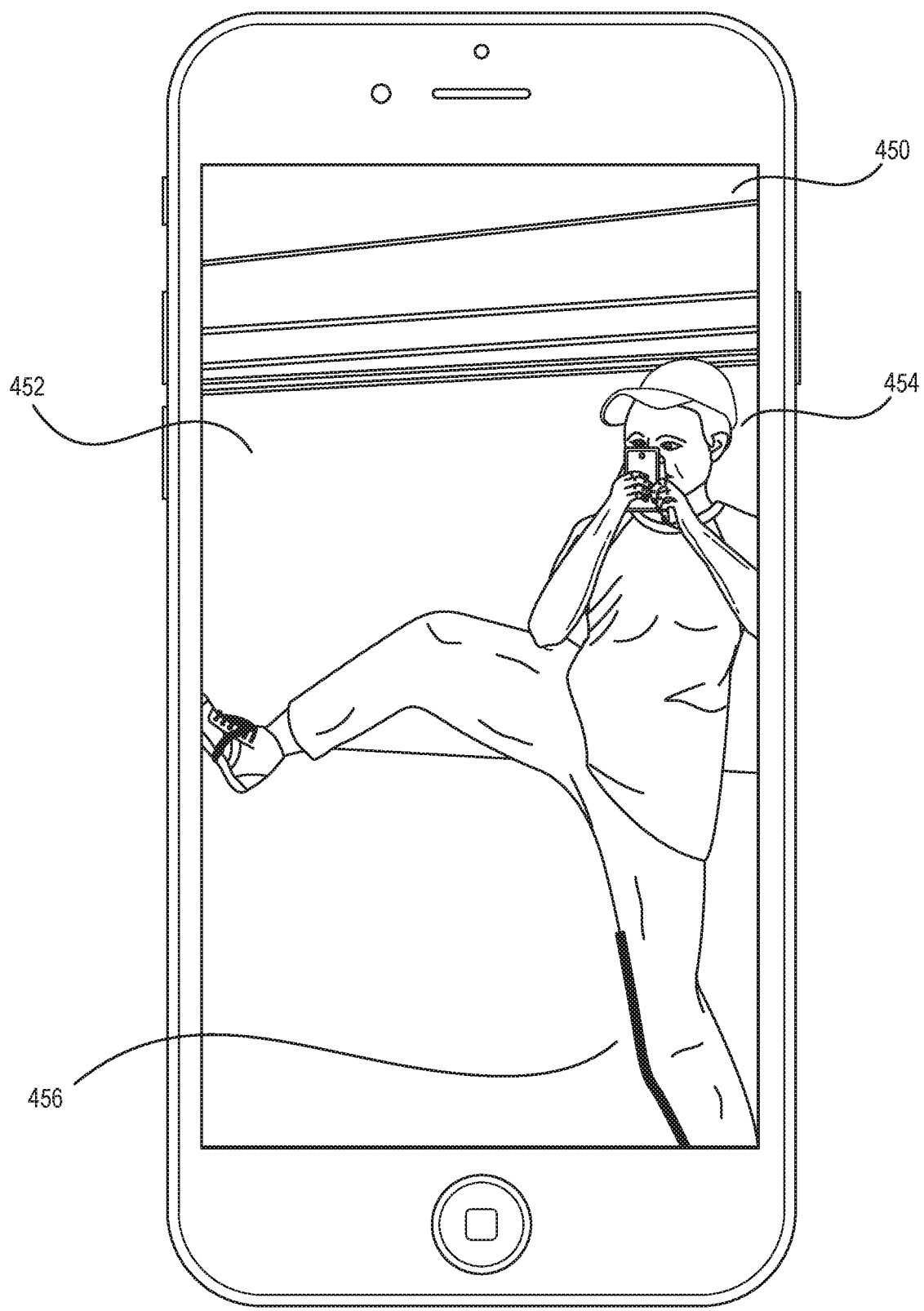
Figure 4H:
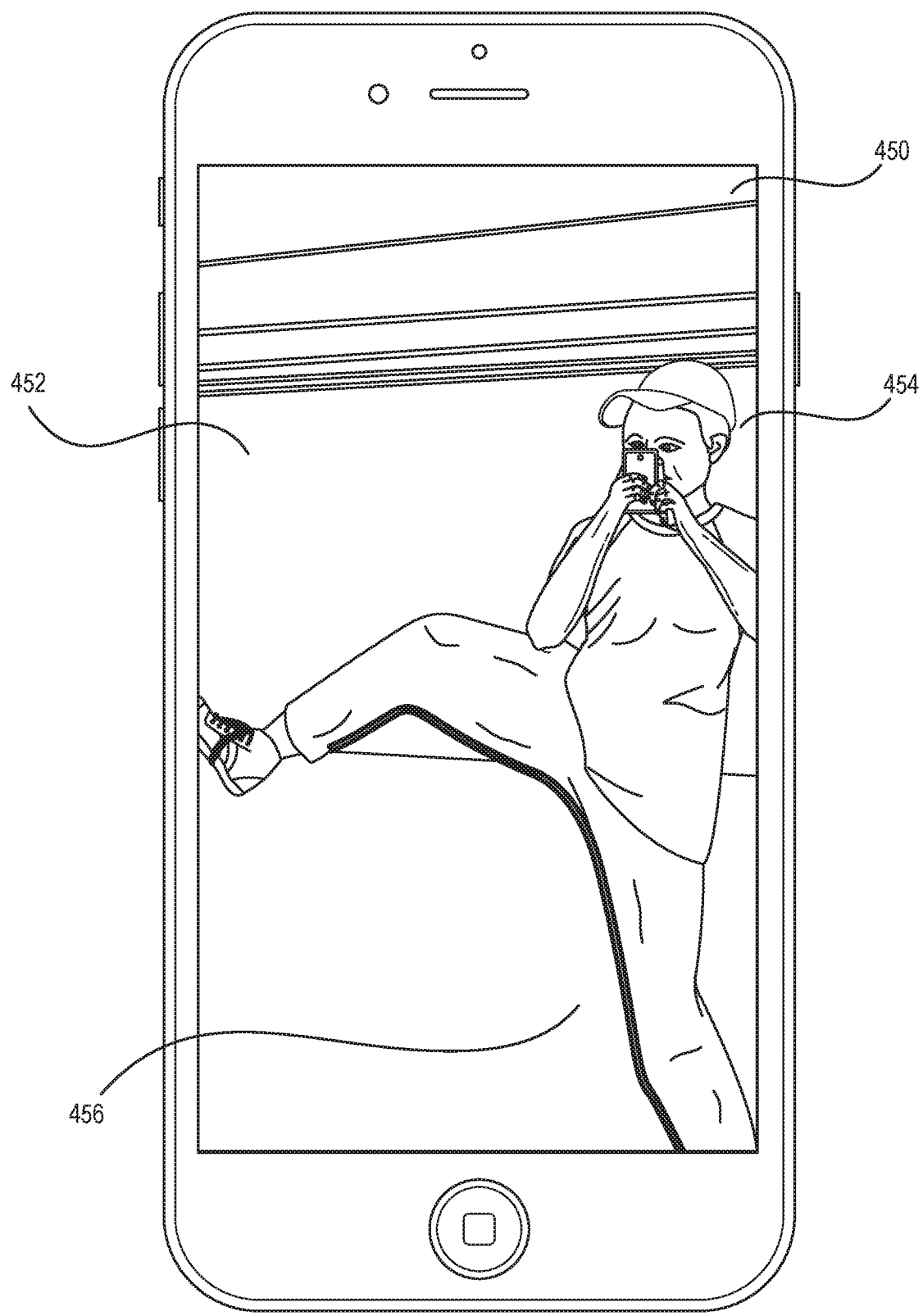
Figure 4I:
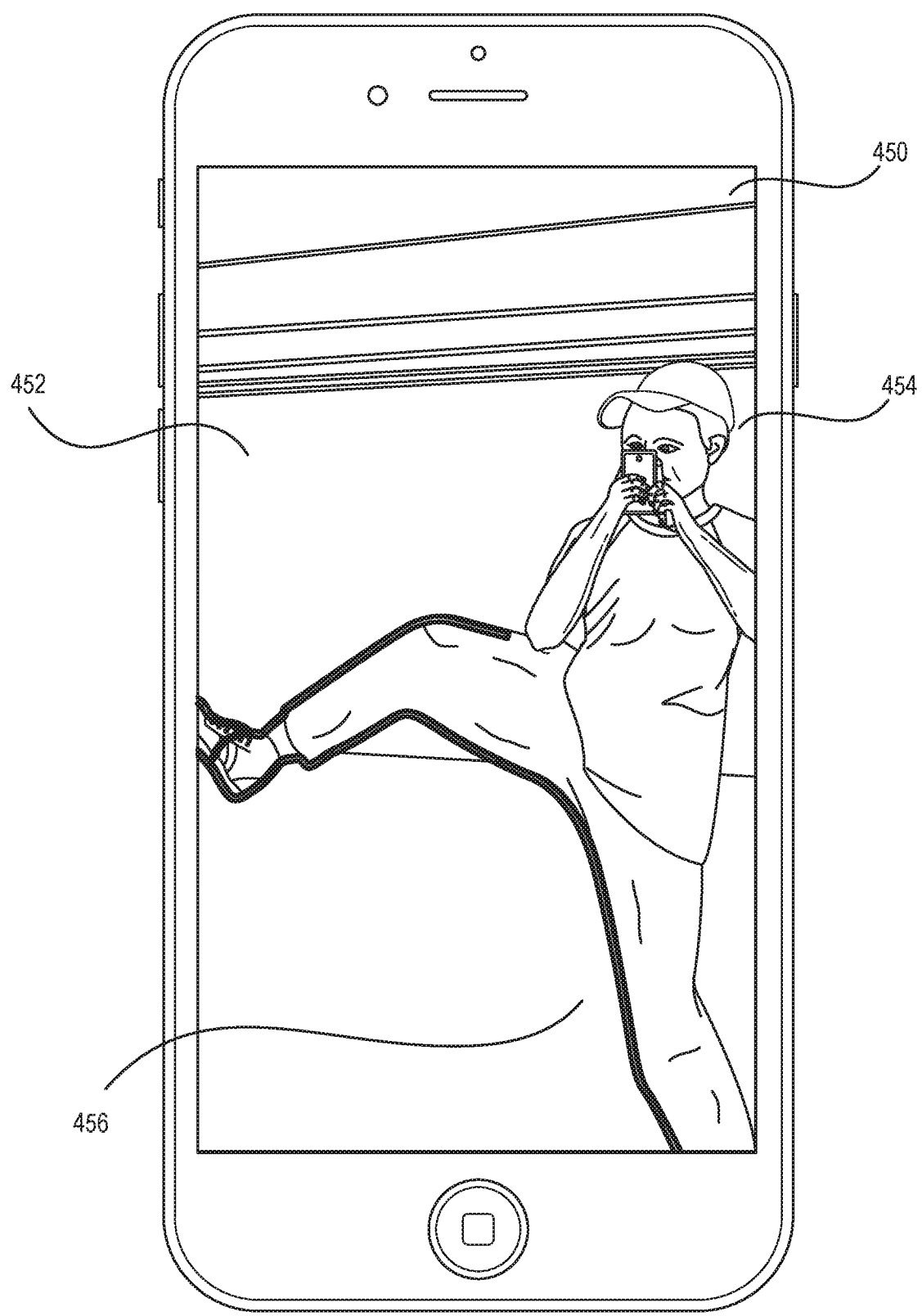
Figure 4J:
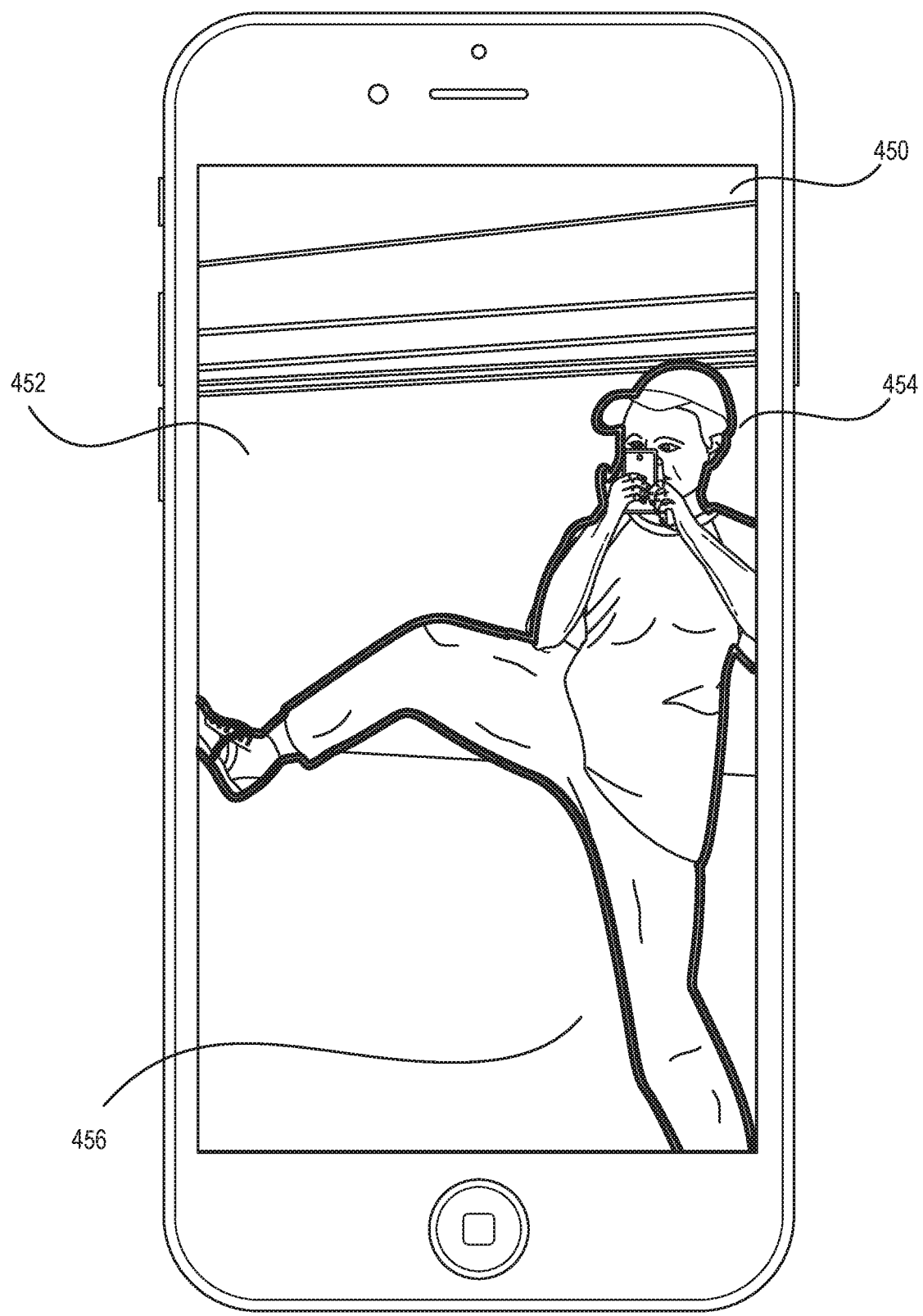

In some embodiments, the user can select the virtual magic marker as their writing instrument to draw using one or more inks that are styled to create a particular effect. For example, as illustrated in FIG. 4D, the user can select the virtual magic marker 408 through the interface 430 being accessed through the computing device. Once the virtual magic marker 408 has been selected, the interface 430 can present a number of virtual ink options 434 for selection. The drawings created using the virtual magic marker 408 can correspond to the selected virtual ink. Some example virtual inks can include a metal ink that simulates a metallic effect in the drawn portions, a sketchy ink that simulates a sketched drawing effect, a neon ink that simulates neon light (e.g., flickering neon light) in the drawn portions, a fire ink that simulates fire in the drawn portions, and an electric ink that simulates electricity in the drawn portions. In the example of FIG. 4D, the user has selected the neon virtual ink option through the touch screen display. FIGS. 4E-F illustrate an interface 440 in which the user is drawing "3 years!" 442 using the selected virtual magic marker and the selected neon virtual ink. The user has the option to erase any portion of the drawing using the eraser option, as described above. As shown, the drawing 442 appears as an overlay in the media content item 444. The user can select an option 446 to finalize the visual modifications made to the media content item 444. In some embodiments, rather than drawing text (e.g., the drawing 442), the user can input the text using a virtual keyboard and the drawing module 206 can automatically style the text using the desired writing instrument (e.g., virtual magic marker) and style option (e.g., a color from the color palette or a virtual ink).

In various embodiments, the color selection module 208 can provide the user with options for selecting a color to be used, for example, when drawing using a virtual writing instrument or inputting text. In some embodiments, the color selection module 208 provides a virtual color palette that includes options for selecting various colors that are available. In some embodiments, the color selection module 208 provides a virtual color spectrum from which the user can select colors. For example, the user can tap and navigate the user's finger across the virtual color spectrum to choose a desired color. In some embodiments, the creative tools interface can provide an eyedropper tool option. The user can use the eyedropper tool to select a portion of a media content item. Upon selecting the portion, the color selection module 208 can select a color corresponding to the selected portion for the user, for example, to be used when drawing or inputting text. In some embodiments, once the color selection module 208 identifies the color corresponding to the portion selected using the eyedropper tool, the color selection module 208 can provide a virtual color palette of colors that are related to the identified color. Such related colors may be determined using generally known color processing techniques (e.g., color wheels, etc.). In some embodiments, the user can select an option to obtain, or download, different sets of colors that are available through the social networking system. In some embodiments, the user can select an option to purchase different sets of colors that are available through the social networking system.

In some embodiments, the graphical overlay module 210 can provide the user with options for inserting graphical overlays in media content items. For example, the graphical overlay module 210 can provide the user with a set of virtual stickers that can be inserted in a media content item. Upon selecting one or more of the virtual stickers, the graphical overlay module 210 can insert the selected virtual stickers into the desired media content item. The user can drag and position any of the virtual stickers in the media content item as desired, for example, by performing various touch screen gestures (e.g., drag gesture). In some embodiments, the user can select an option to obtain, or download, different sets of virtual stickers that are available through the social networking system. In some embodiments, the user can select an option to purchase different sets of virtual stickers that are available through the social networking system. In some embodiments, the graphical overlay module 210 provides suggestions for graphical overlays, or virtual stickers, to be used in a media content item. In such embodiments, the graphical overlay module 210 can analyze the subject matter of the media content item, for example, using a trained machine learning model (e.g., content classifier) to identify various objects (e.g., identities, or names, of individuals, objects, activities, products, logos, animals, points of interest, or other concepts) present in the media content item. Based on the identified objects, the graphical overlay module 210 can suggest various graphical overlays to the user. For example, if a media content item is a self-portrait (or selfie) of a user, then the graphical overlay module 210 can provide a virtual sticker representing a speech bubble as one suggestion. The user can then input text to be included in the speech bubble, as described above.

In some embodiments, the animation module 212 can provide the user with options for animating text. For example, after inputting text, the user can select an animate option that causes the text to animate. The animate options can include options to make characters in the text to move in one or more directions (e.g., jiggling characters, text moves along in a specified trajectory or path, text moves around in the interface and bounces off the edges of the interface, etc.). In some embodiments, the text is animated using various shading techniques that enhance the appearance of the text. In some embodiments, the shading of the text changes in response to various device-based gestures. In one example, the shading of the text can change as the user tilts the computing device on which the shaded text is being displayed. In this example, the text can be shaded differently depending on the axis along which the computing device is tilted or rotated. Various sensors in the computing device can be utilized to determine the direction and/or amount of tilt or rotation. The animation module 212 can appropriately shade the text based on these determinations. In some embodiments, the user can select a color theme to be used for shading the text.

Figure 4K:
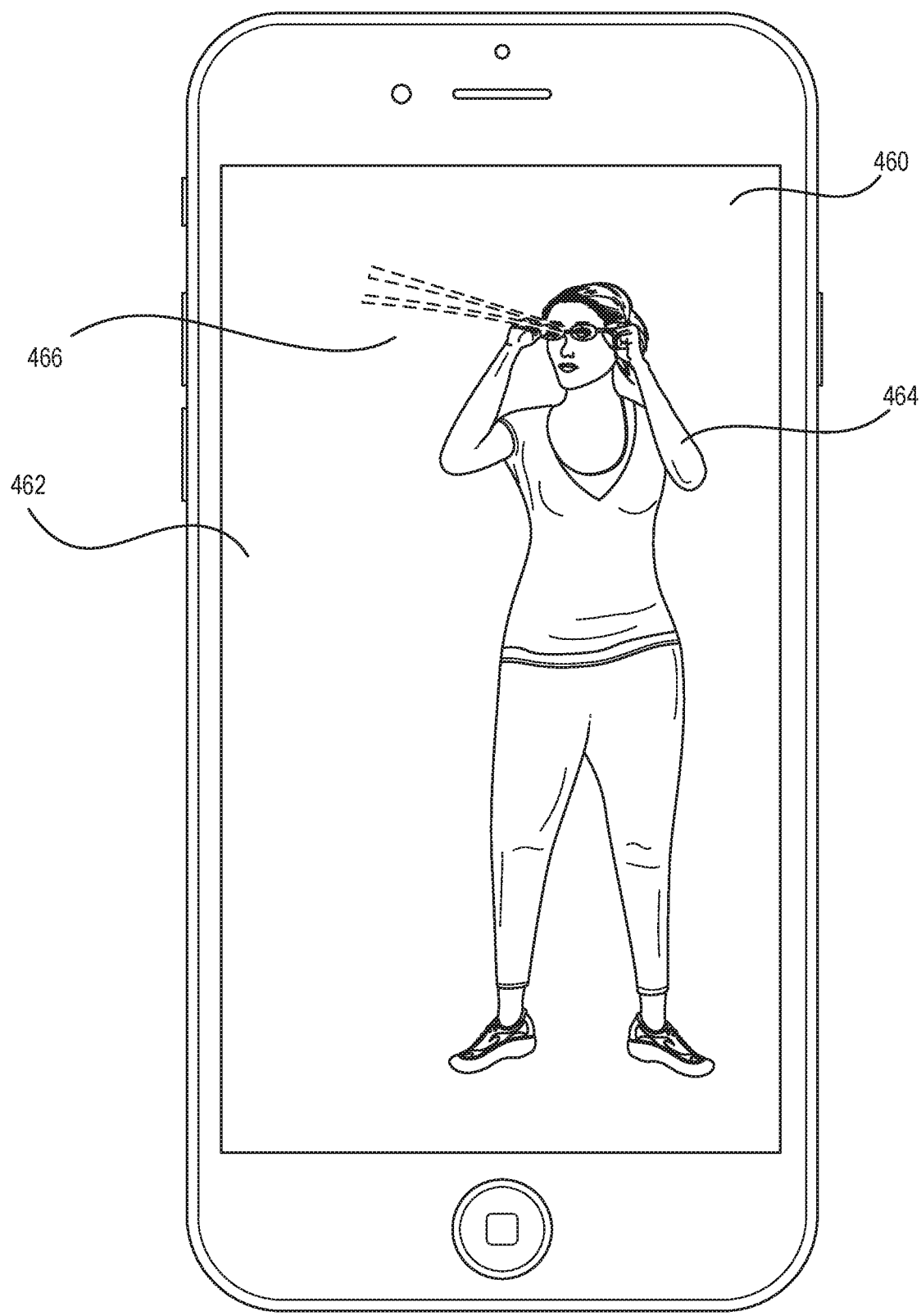
Figure 4L:
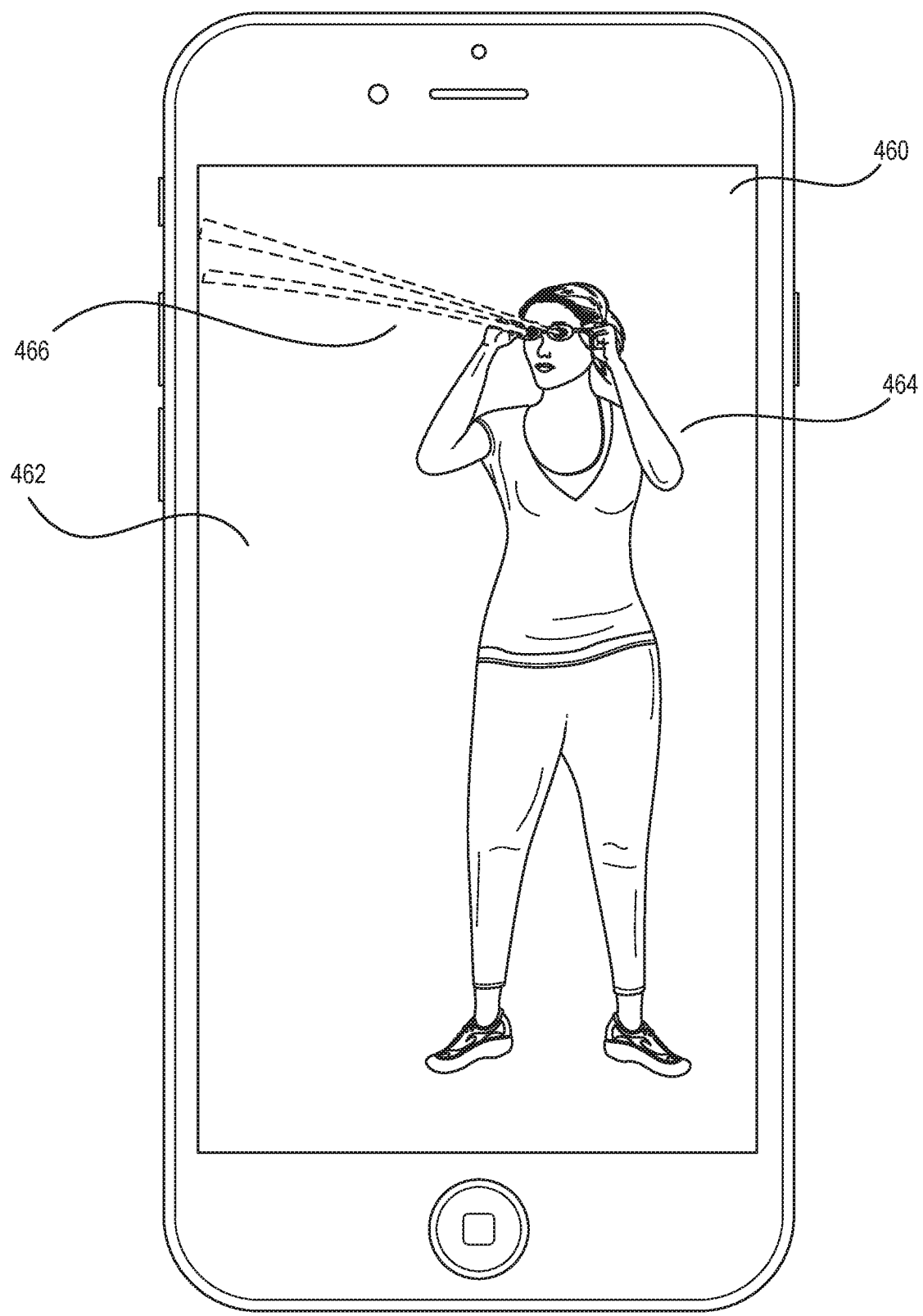

In some embodiments, the animation module 212 can provide the user with options for inserting animated graphical overlays in media content items. In some embodiments, the graphical overlays are animated virtual stickers, as described above. In some embodiments, the graphical overlays are animated to trace, or follow, a one or more paths, trajectories, or boundaries of objects in the media content item. For example, FIGS. 4G-J illustrate an interface 450 in which a media content item 452 is presented. In this example, the user operating the computing device can select an animation option to select from one or more animated graphical overlay options. Some examples of animated graphical overlays can include a lightning bolt animation, a perforated edge animation, or a laser beam animation, to name some examples. In the example of FIGS. 4G-J, the user has selected a lightning bolt animation that traces an outline 456 of a person 454 in the media content item. In response, a lightning bolt 456 is animated along the outline of the person 454. In some embodiments, the rate, or speed, at which the graphical overlay (e.g., lightning bolt) is animated can be adjusted. In some embodiments, the user operating the computing device can manually define an outline along which a graphical overlay will be animated in a media content item. In some embodiments, the animation module 212 can automatically determine one or more outlines along which a graphical overlay will be animated in a media content item, for example, using generally known line detection techniques and/or edge detection techniques. Such outlines can be provided to the user as suggestions for use in the media content item. FIGS. 4K-L illustrate another example of an animated graphical overlay. For example, FIGS. 4K-L illustrate an interface 460 in which a media content item 462 is presented. In this example, the user operating the computing device has selected an animation option to cause a graphical overlay 466 (e.g., a laser beam animation) to be animated in the media content item 462. In this example, the laser beam 466 originates from the eyes of a person 464 and projects toward a distant point or region of the interface 460. In some embodiments, the user operating the computing device can manually define a start point and an end point along which a graphical overlay will be animated in a media content item. In some embodiments, the animation module 212 can automatically determine a start point and an end point along which a graphical overlay will be animated in a media content item. For example, in some embodiments, animated graphical overlays can be suggested by detecting facial features in a media content item using generally known face detection techniques. In this example, the start point and/or end point for a given animated graphical overlay can be determined based on facial features (e.g., eyes, nose, mouth, ears, etc.) that were detected in the media content item.

In some embodiments, the animation module 212 can provide an option to create a video loop, or boomerang, of a set of captured video frames. For example, when the option is selected, the user can capture a video content using the computing device. Once captured, the animation module 212 can create a media content item that includes a continuous loop of the video content. In some embodiments, the video loop is limited to a pre-defined video length. In some embodiments, the animation module 212 instructs the computing device to automatically capture video content when a camera mode is enabled without any action from the user. In such embodiments, the user can select the video loop option at any time and, in response, the animation module 212 will create a video loop using a portion of frames that were being captured up until the user selected the video loop option. The examples herein describe the ability to access various interfaces and/or features by selecting appropriate options through a computing device being operated by a user. In some embodiments, such interfaces and/or features may also be accessed by performing appropriate touch screen gestures.

Figure 3:
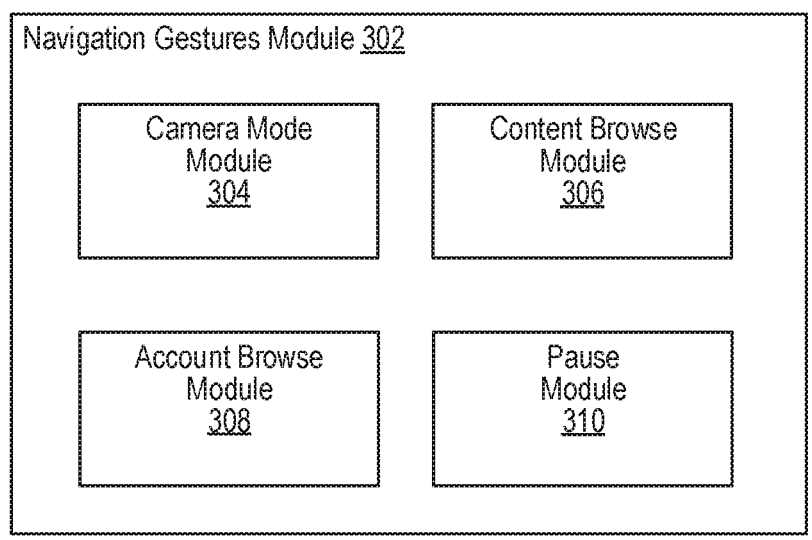
FIG. 3 illustrates an example navigation gestures module, according to an embodiment of the present disclosure.

FIG. 3 illustrates an example navigation gestures module 302, according to an embodiment of the present disclosure. In some embodiments, the navigation gestures module 112 of FIG. 1 can be implemented with the navigation gestures module 302. As shown in the example of FIG. 3, the navigation gestures module 302 can include a camera mode module 304, a content browse module 306, an account browse module 308, and a pause module 310.

In various embodiments, the navigation gestures module 302 is configured to perform operations in response to detecting various touch screen gestures that are performed by the user operating the computing device. For example, as mentioned, the user operating the computing device can interact with the social networking system to access various content feeds in which media content items are presented.

While accessing a content feed, in some embodiments, the user can perform gestures to activate various certain features. For example, in some embodiments, when the user performs a swipe gesture (e.g., swiping from the left edge of the display screen or swiping from the right edge of the display screen), the camera mode module 304 is configured to present a camera interface in the display screen of the computing device. The user can interact with the camera interface to capture media content items to be posted through the social networking system. In some embodiments, the camera mode module 304 provides a camera interface that is built into the software application (e.g., social networking application) running on the computing device. In some embodiments, the camera mode module 304 causes a camera application in the computing device to be opened or executed.

As mentioned, a user can access content feeds that include media content items that were posted through the social networking system. There may be any number of content feeds that are accessible through the social networking system. For example, each user of the social networking system may have an ephemeral content feed in which ephemeral media content items posted by the user are included as well as a non-ephemeral content feed in which non-ephemeral media content items posted by the user are included. In some embodiments, the user can access a content feed that includes media content items (ephemeral and/or non-ephemeral) that were posted by the user's friends (e.g., users being followed) in the social networking system. In general, the user operating the computing device can navigate a content feed, for example, using scroll gestures (e.g., performing an upward or downward scroll gesture) to view the media content items that are included in the content feed. In some embodiments, while viewing a media content item that was posted by a first user, the user operating the computing device can perform a tap gesture to view another media content item that was posted by the first user. For example, when the tap gesture is detected, the content browse module 306 can obtain another media content item that was published through the social networking system by the first user and present the media content item in the content feed interface. In some embodiments, the user can continue performing tap gestures to view additional media content items from the first user. The media content items presented may correspond to the type of content feed that is being accessed. For example, if the user performs the tap gesture while browsing ephemeral media content items, then the content browse module 306 can obtain and present another ephemeral media content item that was posted by that user.

Figure 4M:
Figure 4N:
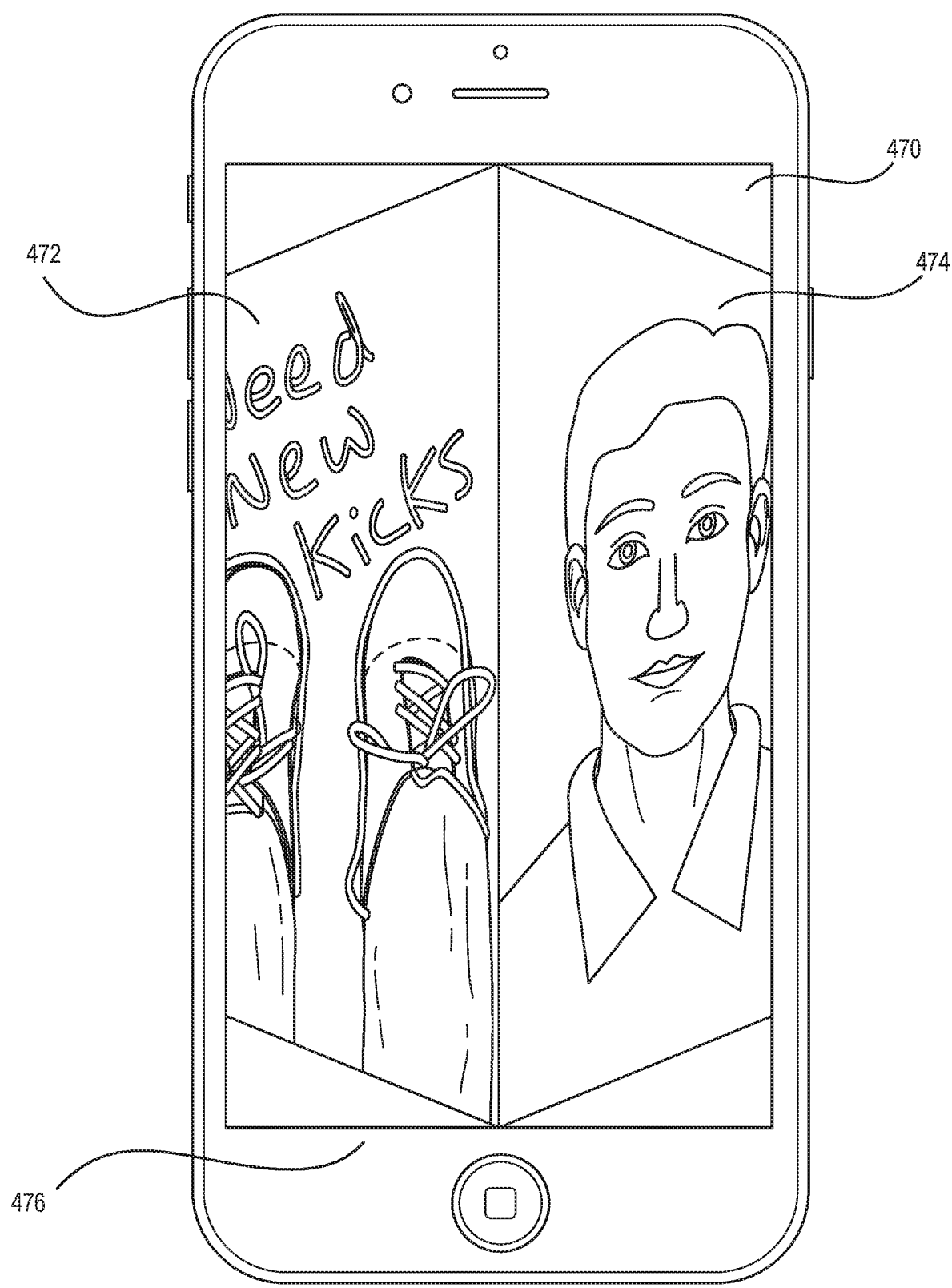
Figure 4O:
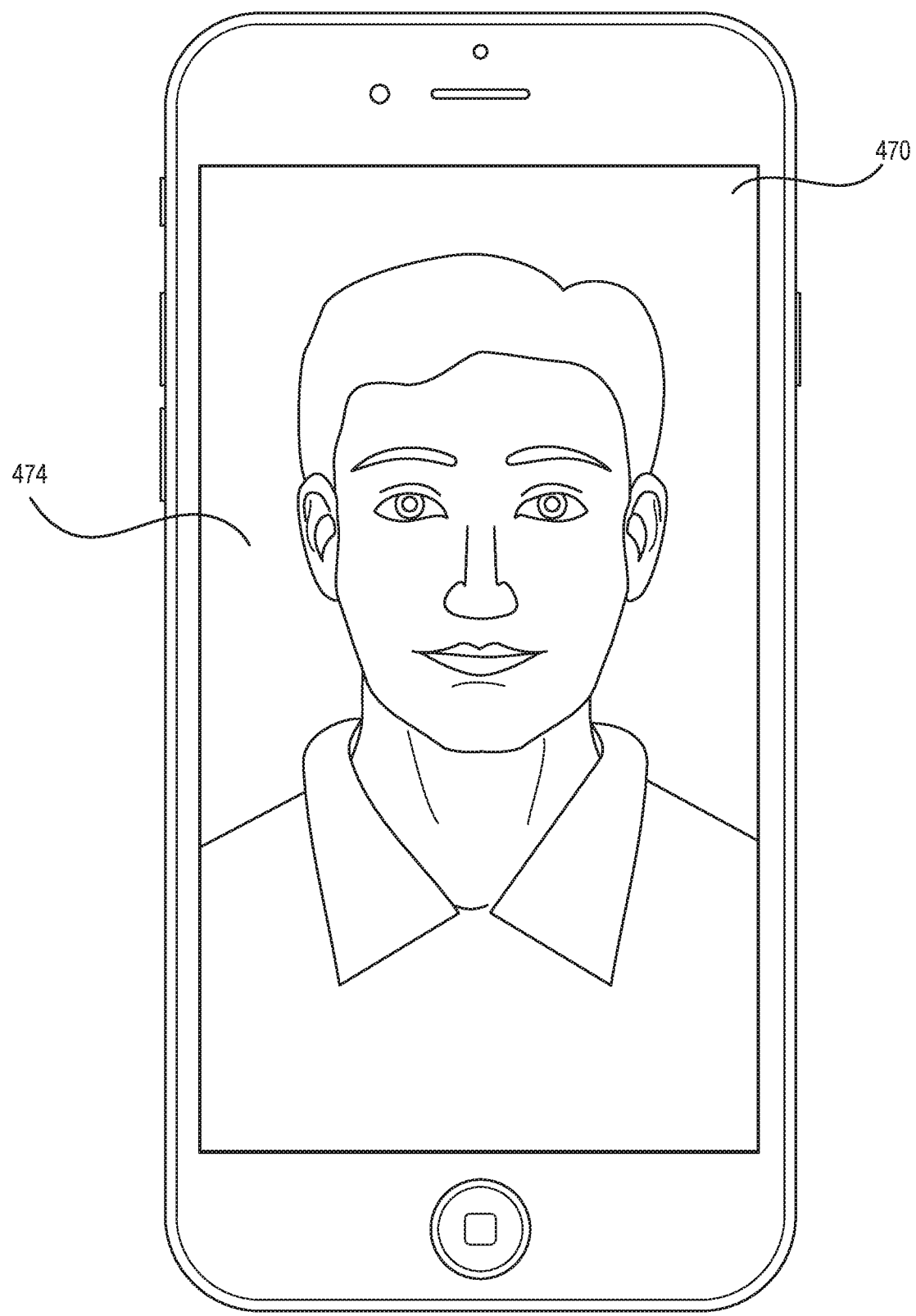

In some embodiments, while browsing a content feed, the user can perform a swipe gesture (e.g., swiping left) through the touch screen display to switch to another user's content feed. In such embodiments, when the swipe gesture is detected, the account browse module 308 can identify another user of the social networking system that is being followed by the user. The account browse module 308 can then change the displayed content feed to correspond to a content feed of the other user. The user operating the computing device can continue navigating the other user's content feed as described above. In some embodiments, the user can continue performing the swipe gesture to access content feeds of other users (e.g., friends or otherwise). In some embodiments, the user can perform a swipe gesture in the opposite direction (e.g., swipe right) to return to a content feed that was previously presented. In some embodiments, the account browse module 308 presents a visual transition when advancing to another content feed, as illustrated in the example of FIGS. 4M-O. For example, in FIG. 4M, the user operating the computing device has performed a swipe gesture in an interface 470 while viewing a media content item 472 that was posted by a first user in a first content feed. In some embodiments, a visual cube transformation 476 is presented in the interface 470 upon detecting the swipe gesture, as illustrated in FIG. 4N. The visual cube transformation 470 can partially display both the media content item 472 that was being accessed in the first content feed and a media content item 474 that will be presented from a second content feed. Once the visual cube transformation is complete, the media content item 474 is presented in the interface 470, as illustrated in FIG. 4O.

In some embodiments, the media content items presented can be videos. In such embodiments, the user can tap a video included in a content feed to begin playback of the video. In some embodiments, the user can pause the video playback by performing a tap-and-hold gesture (or press-and-hold gesture) through the touch screen display of the computing device. Upon detecting the tap-and-hold gesture, the pause module 310 can pause the video playback until the user releases their finger from the touch screen display screen. The video playback can resume once the user releases their finger.

Figure 5:
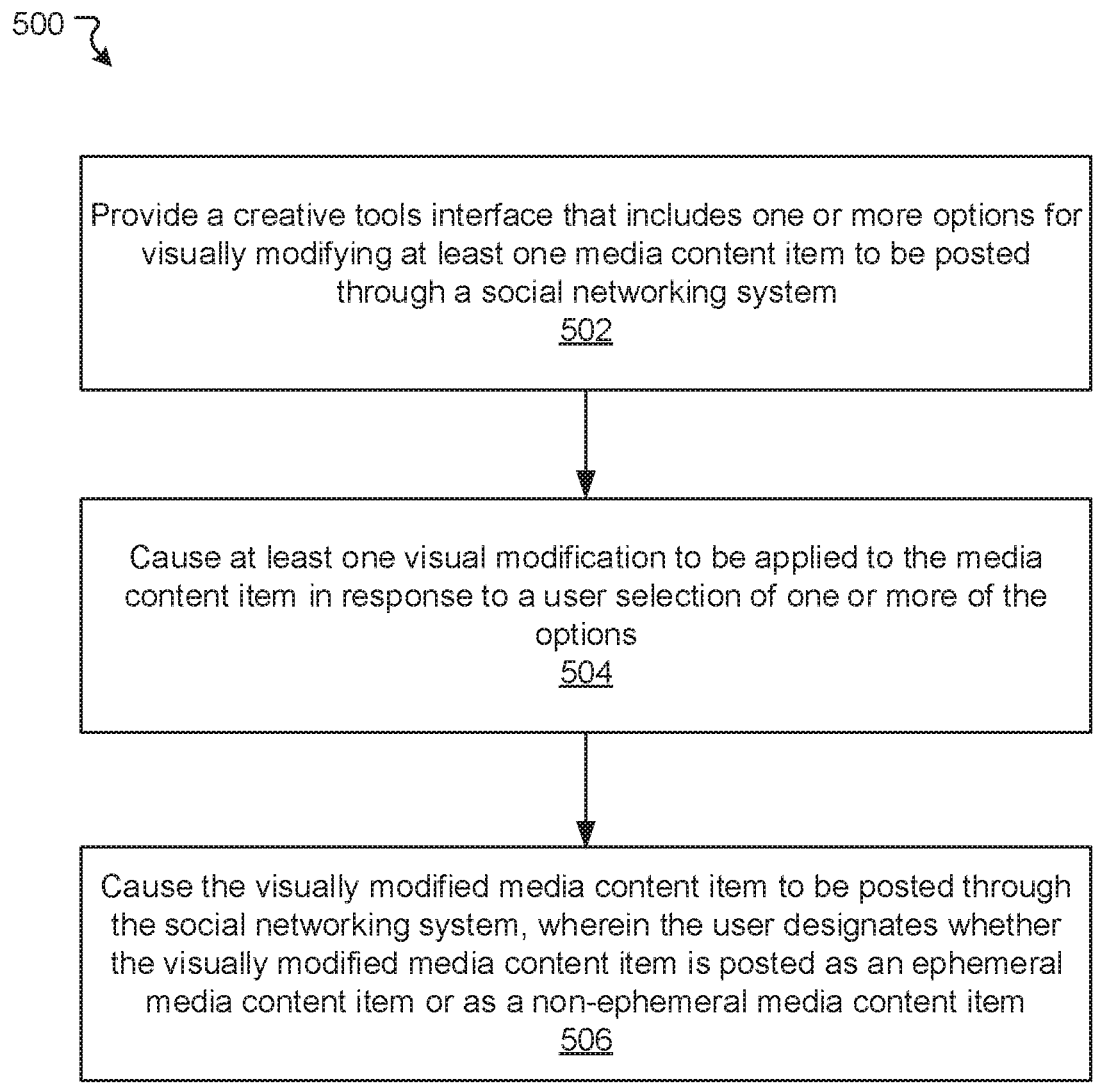
FIG. 5 illustrates an example method for accessing a creative tools interface, according to an embodiment of the present disclosure.

FIG. 5 illustrates an example method 500 for accessing a creative tools interface, according to an embodiment of the present disclosure. It should be appreciated that there can be additional, fewer, or alternative steps performed in similar or alternative orders, or in parallel, within the scope of the various embodiments discussed herein unless otherwise stated.

At block 502, a creative tools interface that includes one or more options for visually modifying at least one media content item to be posted through a social networking system is provided. At block 504, at least one visual modification is applied to the media content item in response to a user selection of one or more of the options. At block 506, the visually modified media content item is posted through the social networking system, wherein the user designates whether the visually modified media content item is posted as an ephemeral media content item or as a non-ephemeral media content item.

Figure 6:
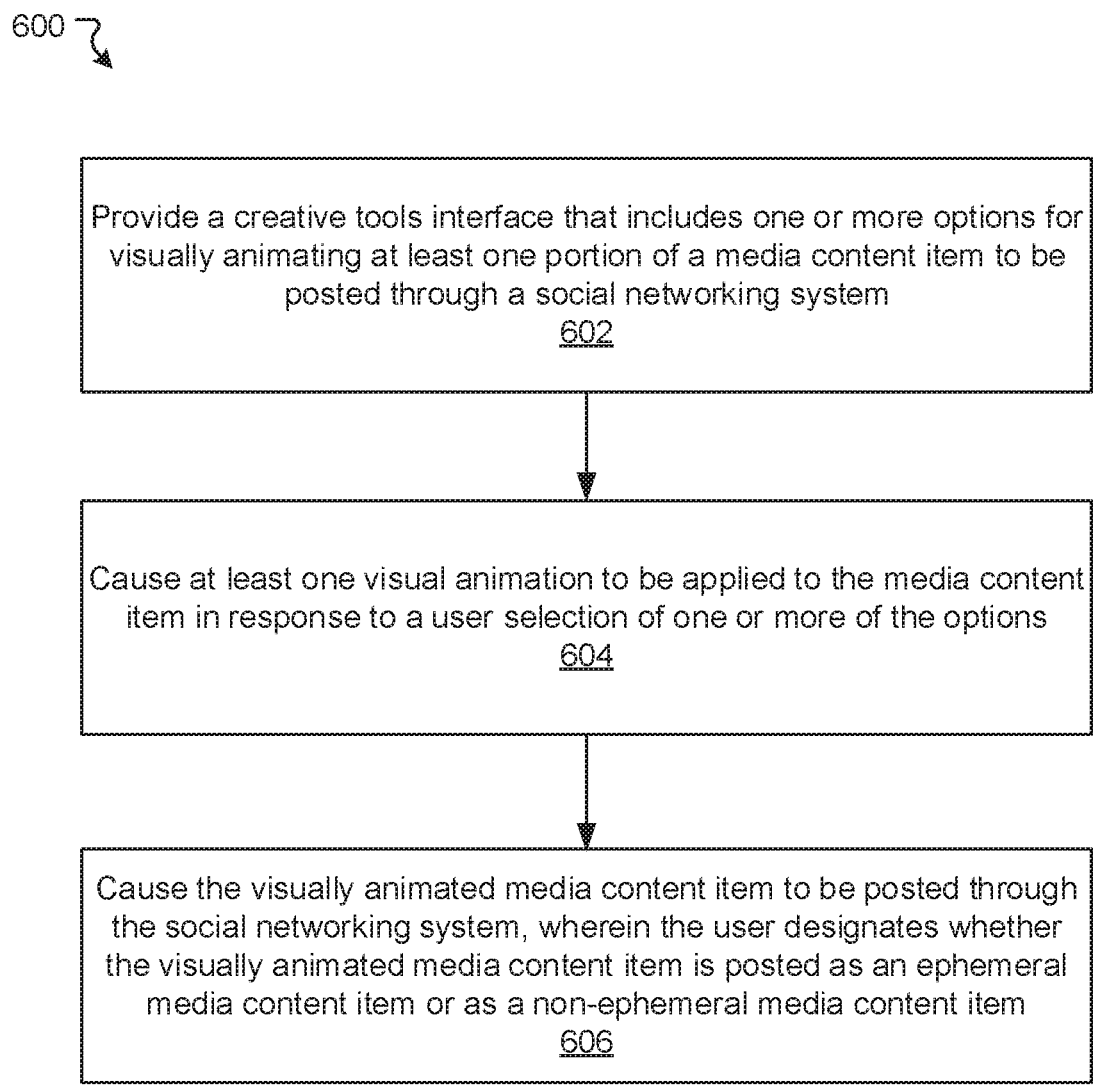
FIG. 6 illustrates an example method for accessing a creative tools animation interface, according to an embodiment of the present disclosure.

FIG. 6 illustrates an example method 600 for accessing a creative tools animation interface, according to an embodiment of the present disclosure. It should be appreciated that there can be additional, fewer, or alternative steps performed in similar or alternative orders, or in parallel, within the scope of the various embodiments discussed herein unless otherwise stated.

At block 602, a creative tools interface that includes one or more options for visually animating at least one portion of a media content item to be posted through a social networking system is provided. At block 604, at least one visual animation is applied to the media content item in response to a user selection of one or more of the options. At block 606, the visually animated media content item is posted through the social networking system, wherein the user designates whether the visually animated media content item is posted as an ephemeral media content item or as a non-ephemeral media content item.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
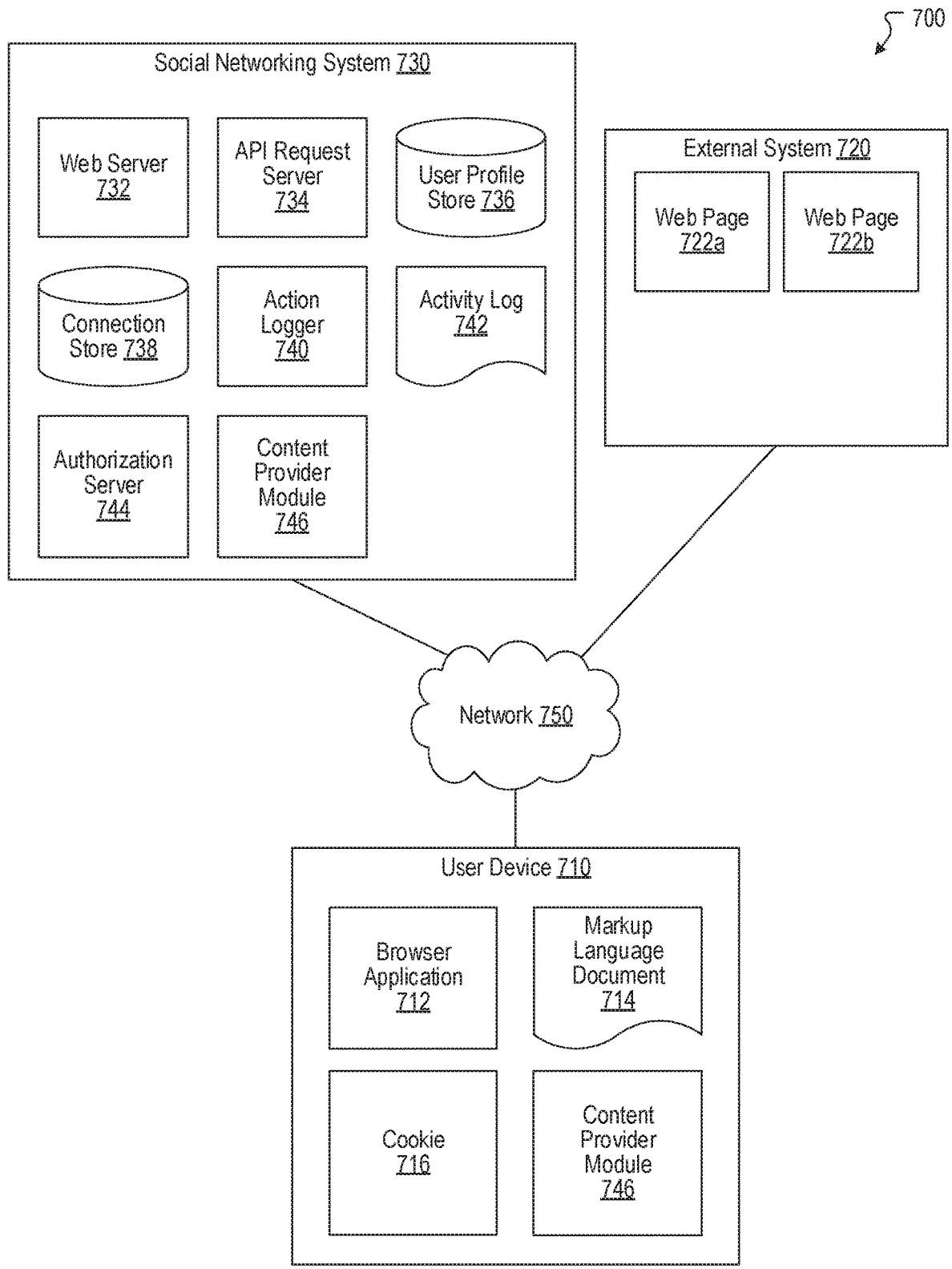
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. As discussed previously, it should be appreciated that there can be many variations or other possibilities.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, media content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and media content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a content provider module 746. The content provider module 746 can, for example, be implemented as the content provider module 102 of FIG. 1. In some embodiments, the content provider module 746, in whole or in part, may be implemented in a user device 710. As discussed previously, it should be appreciated that there can be many variations or other possibilities.

Hardware Implementation

Figure 8:
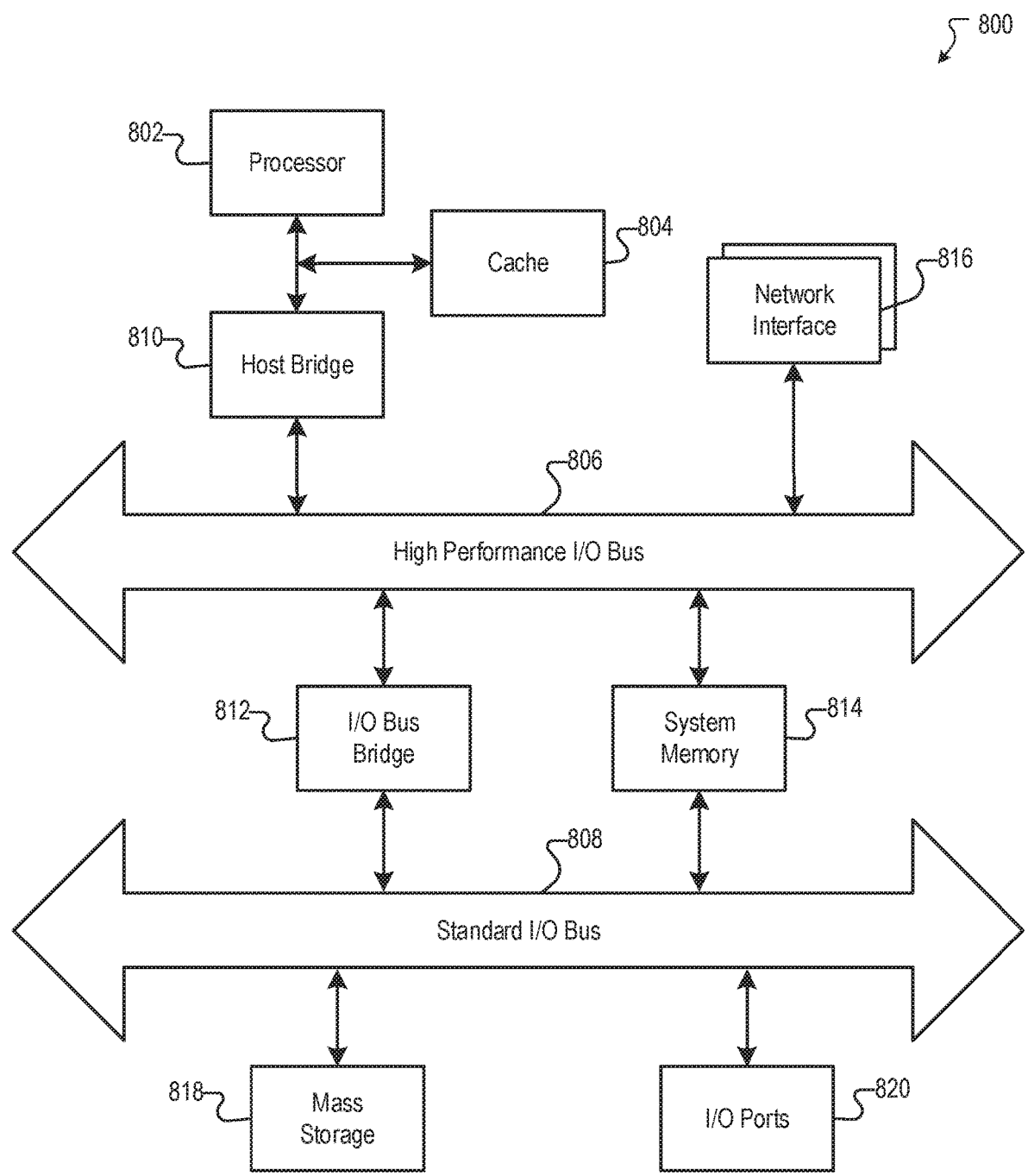
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing device, at least one media content item to be posted through a social networking system;
   identifying, by the computing device, one or more objects in subject matter reflected in the media content item using a machine learning model trained as a content classifier;
   providing, by the computing device, a creative tools interface that includes one or more suggested overlays for visually modifying the media content item based at least in part on the identified objects;
   causing, by the computing device, at least one visual modification to be applied to the media content item in response to a selection by a user of the one or more of the suggested overlays; and
   causing, by the computing device, the visually modified media content item to be posted through the social networking system, wherein the user designates whether the visually modified media content item is posted as an ephemeral media content item or as a non-ephemeral media content item.

2. The computer-implemented method of claim 1, wherein causing at least one visual modification to be applied to the media content item further comprises:
   determining, by the computing device, that the user has selected an option to insert a text overlay in the media content item;
   determining, by the computing device, a string of text specified by the user through a virtual keyboard presented on a touch screen display of the computing device; and
   causing, by the computing device, a text overlay corresponding to the string of text to be inserted in the media content item.

3. The computer-implemented method of claim 2, wherein the suggested overlays include the text overlay.

4. The computer-implemented method of claim 1, wherein causing at least one visual modification to be applied to the media content item further comprises:
   determining, by the computing device, that the user has selected an option to insert a graphical overlay in the media content item;
   determining, by the computing device, at least one graphical overlay that was selected by the user; and
   causing, by the computing device, the selected graphical overlay to be inserted in the media content item.

5. The computer-implemented method of claim 4, wherein the suggested overlays include the graphical overlay.

6. The computer-implemented method of claim 1, wherein causing at least one visual modification to be applied to the media content item further comprises:
   determining, by the computing device, that the user has selected an option to draw content in the media content item;
   determining, by the computing device, content drawn by the user through a touch screen display of the computing device; and
   causing, by the computing device, the drawn content to be inserted in the media content item.

7. The computer-implemented method of claim 1, the method further comprising:
   providing, by the computing device, an interface in which the posted media content item is included;
   determining, by the computing device, that the user has performed one or more navigation gestures while navigating the interface; and
   causing, by the computing device, the interface to be modified in response to the navigation gestures performed.

8. A system comprising:
   at least one processor; and
   a memory storing instructions that, when executed by the at least one processor, cause the system to perform:
   receiving at least one media content item to be posted through a social networking system;
   identifying one or more objects in subject matter reflected in the media content item using a machine learning model trained as a content classifier;
   providing a creative tools interface that includes one or more suggested overlays for visually modifying the media content item based at least in part on the identified objects;
   causing at least one visual modification to be applied to the media content item in response to a selection by a user of the one or more of the suggested overlays; and
   causing the visually modified media content item to be posted through the social networking system, wherein the user designates whether the visually modified media content item is posted as an ephemeral media content item or as a non-ephemeral media content item.

9. The system of claim 8, wherein causing at least one visual modification to be applied to the media content item further causes the system to perform:
   determining that the user has selected an option to insert a text overlay in the media content item;
   determining a string of text specified by the user through a virtual keyboard presented on a touch screen display of the system; and
   causing a text overlay corresponding to the string of text to be inserted in the media content item.

10. The system of claim 9, wherein the suggested overlays include the text overlay.

11. The system of claim 8, wherein causing at least one visual modification to be applied to the media content item further causes the system to perform:
    determining that the user has selected an option to insert a graphical overlay in the media content item;
    determining at least one graphical overlay that was selected by the user; and
    causing the selected graphical overlay to be inserted in the media content item.

12. The system of claim 11, wherein the suggested overlays include the graphical overlay.

13. The system of claim 8, wherein causing at least one visual modification to be applied to the media content item further causes the system to perform:
    determining that the user has selected an option to draw content in the media content item;
    determining content drawn by the user through a touch screen display of the system; and
    causing the drawn content to be inserted in the media content item.

14. The system of claim 8, wherein the instructions further cause the system to perform:
    providing an interface in which the posted media content item is included;

determining that the user has performed one or more navigation gestures while navigating the interface; and causing the interface to be modified in response to the navigation gestures performed.

15. A non-transitory computer-readable storage medium including instructions that, when executed by at least one processor of a computing system, cause the computing system to perform a method comprising:

receiving at least one media content item to be posted through a social networking system;

identifying one or more objects in subject matter reflected in the media content item using a machine learning model trained as a content classifier;

providing a creative tools interface that includes one or more suggested overlays for visually modifying the media content item based at least in part on the identified objects;

causing at least one visual modification to be applied to the media content item in response to a selection by a user of the one or more of the suggested overlays; and causing the visually modified media content item to be posted through the social networking system, wherein the user designates whether the visually modified media content item is posted as an ephemeral media content item or as a non-ephemeral media content item.

16. The non-transitory computer-readable storage medium of claim 15, wherein causing at least one visual modification to be applied to the media content item further causes the computing system to perform:

determining that the user has selected an option to insert a text overlay in the media content item;

determining a string of text specified by the user through a virtual keyboard presented on a touch screen display of the computing system; and causing a text overlay corresponding to the string of text to be inserted in the media content item.

17. The non-transitory computer-readable storage medium of claim 16, wherein the suggested overlays include the text overlay.

18. The non-transitory computer-readable storage medium of claim 15, wherein causing at least one visual modification to be applied to the media content item further causes the computing system to perform:

determining that the user has selected an option to insert a graphical overlay in the media content item;

determining at least one graphical overlay that was selected by the user; and causing the selected graphical overlay to be inserted in the media content item.

19. The non-transitory computer-readable storage medium of claim 18, wherein the suggested overlays include the graphical overlay.

20. The non-transitory computer-readable storage medium of claim 15, wherein causing at least one visual modification to be applied to the media content item further causes the computing system to perform:

determining that the user has selected an option to draw content in the media content item;

determining content drawn by the user through a touch screen display of the computing system; and causing the drawn content to be inserted in the media content item.

* * * * *